(12) United States Patent
Freedman et al.

(10) Patent No.: US 11,860,829 B2
(45) Date of Patent: Jan. 2, 2024

(54) PAGE SPLIT DETECTION AND AFFINITY IN QUERY PROCESSING PUSHDOWNS

(71) Applicant: Microsoft Technology Licensing, LLC, Redmond, WA (US)

(72) Inventors: Craig S. Freedman, Sammamish, WA (US); Adrian-Leonard Radu, Sammamish, WA (US); Daniel G. Schall, Woodinville, WA (US); Hanumantha R. Kodavalla, Sammamish, WA (US); Panagiotis Antonopoulos, Redmond, WA (US); Raghavendra Thallam Kodandaramaih, Redmond, WA (US); Alejandro Hernandez Saenz, Kirkland, WA (US); Naveen Prakash, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/180,508

(22) Filed: Feb. 19, 2021

(65) Prior Publication Data
US 2022/0197873 A1    Jun. 23, 2022

Related U.S. Application Data

(60) Provisional application No. 63/127,790, filed on Dec. 18, 2020.

(51) Int. Cl.
*G06F 16/21* (2019.01)
*G06F 16/24* (2019.01)
*G06F 16/245* (2019.01)

(52) U.S. Cl.
CPC ............ *G06F 16/21* (2019.01); *G06F 16/245* (2019.01)

(58) Field of Classification Search
None
See application file for complete search history.

(56) References Cited

U.S. PATENT DOCUMENTS

| 5,806,065 A * | 9/1998 | Lomet ................. G06F 16/2246 |
| | | 707/999.008 |
| 2006/0200752 A1* | 9/2006 | Sellers .................. G06F 40/114 |
| | | 715/209 |

(Continued)

OTHER PUBLICATIONS

John Robinson; THe K-D-B Tree: A Search Structure for Large Multidimensional Dynamic Indexes; ACM; 1981; pp. 10-18 (Year: 1981).*

(Continued)

*Primary Examiner* — Albert M Phillips, III
*Assistant Examiner* — Jermaine A Mincey
(74) *Attorney, Agent, or Firm* — Weaver IP L.L.C.

(57) ABSTRACT

Methods for page split detection and affinity in query processing pushdowns are performed by systems and devices. Page servers perform pushdown operations based on specific, and specifically formatted or generated, information, instructions, and data provided thereto from a compute node. Page servers also determine that page splits have occurred during reading of data pages maintained by page servers during pushdown operations, and also during fulfillment of compute node data requests. To detect a data page has split, page servers utilize information from a compute node of an expected next data page which is compared to a next data page in the page server page index. A mismatch in the comparison by page servers indicates data page was split. Compute nodes and page servers store and maintain off-row data generated during data operations via page (Continued)

affinity considerations where the off-row data is stored at the same page server as the data.

20 Claims, 7 Drawing Sheets

(56) References Cited

U.S. PATENT DOCUMENTS

| | | | |
|---|---|---|---|
| 2007/0016628 | A1 | 1/2007 | Barrs et al. |
| 2011/0016127 | A1 | 1/2011 | Uppala |
| 2015/0227533 | A1 | 8/2015 | Goldstein et al. |
| 2016/0004679 | A1* | 1/2016 | Grimm .................. G06F 40/20 715/753 |
| 2016/0085643 | A1 | 3/2016 | Mcalister et al. |
| 2016/0125000 | A1 | 5/2016 | Meacham et al. |
| 2018/0032412 | A1 | 2/2018 | Zhou et al. |
| 2019/0079834 | A1 | 3/2019 | De Schrijver et al. |
| 2019/0392061 | A1 | 12/2019 | Terry et al. |
| 2020/0050692 | A1 | 2/2020 | Antonopoulos et al. |
| 2020/0293545 | A1* | 9/2020 | Li ....................... G06F 16/2379 |
| 2020/0334374 | A1 | 10/2020 | Mandadi et al. |
| 2022/0197892 | A1 | 6/2022 | Freedman et al. |

OTHER PUBLICATIONS

"Amazon Aurora Parallel Query is Generally Available", Retrieved from: https://aws.amazon.com/about-aws/whats-new/2018/09/amazon-aurora-parallel-query-is-generally-available/, Sep. 20, 2018, 2 Pages.

"Working with parallel query for Amazon Aurora MySQL", Retrieved from: https://docs.aws.amazon.com/AmazonRDS/latest/AuroraUserGuide/aurora-mysql-parallel-query.html, Retrieved on: Jan. 21, 2021, 19 Pages.

Barr, Jeff, "New—Parallel Query for Amazon Aurora", Retrieved from: https://aws.amazon.com/blogs/aws/new-parallel-query-for-amazon-aurora/, Sep. 20, 2018, 7 Pages.

Jones, Steve, "Digging into Azure SQL Database Hyperscale Edition", Retrieved from: https://www.sqlservercentral.com/articles/digging-into-azure-sql-database-hyperscale-edition, Oct. 22, 2019, 11 Pages.

Popovic, et al., "Business Critical tier—Azure SQL Database and Azure SQL Managed Instance", Retrieved from: https://docs.microsoft.com/en-us/azure/azure-sql/database/service-tier-business-critical, Dec. 4, 2018, 4 Pages.

Stefani, Stefano, "SIGMOD Systems Award Talk on the Aurora Database System", In Publication of ACM Sigmod, 2019, 2 Pages.

Vuppalapati, et al., "Building an Elastic Query Engine on Disaggregated Storage", In Proceedings of 17th USENIX Symposium on Networked Systems Design and Implementation, Feb. 25, 2020, pp. 449-462.

"Accelerate Your Analytic Queries with Amazon Aurora Parallel Query (DAT362)—AWS re:Invent 2018", Retrieved from: https://www.slideshare.net/AmazonWebServices/accelerate-your-analytic-queries-with-amazon-aurora-parallel-query-dat362-aws-reinvent-2018, Nov. 30, 2018, 14 Pages.

"A Technical Overview of the Oracle Exadata Database Machine and Exadata Storage Server", In Oracle White Paper, Jun. 2012, 36 Pages.

"International Search Report and Written Opinion Issued in PCT Application No. PCT/US21/059414", dated Mar. 3, 2022, 12 Pages.

Stein, et al., "Hyperscale Service Tier", Retrieved from: https://web.archive.org/web/20201021060851/https://docs.microsoft.com/en-us/azure/azure-sql/database/service-tier-hyperscale, Oct. 19, 2020, 12 Pages.

"International Search Report and Written Opinion Issued in PCT Application No. PCT/US21/058374", dated Feb. 28, 2022, 14 Pages.

"Non Final Office Action Issued in U.S. Appl. No. 17/180,519", dated Dec. 19, 2022, 10 Pages.

"Final Office Action Issued in U.S. Appl. No. 17/180,519", dated Mar. 20, 2023, 11 Pages.

"Notice of Allowance Issued in U.S. Appl. No. 17/180,519", dated May 11, 2023, 13 Pages.

* cited by examiner

PAGE SPLIT DETECTION AND AFFINITY IN QUERY PROCESSING PUSHDOWNS

CROSS-REFERENCE TO RELATED APPLICATION(S)

The present application claims priority to U.S. Provisional Patent Application No. 63/127,790, entitled "PAGE SPLIT DETECTION AND AFFINITY IN QUERY PROCESSING PUSHDOWNS," and filed on Dec. 18, 2020, the entirety of which is incorporated by reference herein.

BACKGROUND

Large scale query processing systems can include one or more compute nodes that handle and process queries against databases having data in data pages stored and maintained by page servers. In current systems, compute nodes perform the processing operations based on data that is retrieved from the page servers, and this requires very high volumes of network traffic between the compute nodes and the page servers, and also causes very high processing and memory burdens on the compute nodes. These issues are compounded when databases are scaled out to larger sizes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for page split detection and affinity in query processing pushdowns are performed by systems and devices. Page servers perform pushdown operations based on specific, and specifically formatted or generated, information, instructions, and data provided thereto from a compute node. Pushdown operations are processing operations that would normally be performed by a compute node. Page servers also determine that page splits have occurred during the reading of data pages maintained by the page servers during pushdown operations, and also during fulfillment of compute node data requests. To detect that a data page has split, page servers utilize information provided from a compute node that relates to an expected next data page, associated with the data page, which is compared to a next data page maintained in the page server page index. A mismatch in the comparison determined by the page servers indicates that a data page was split. Compute nodes and page servers also store and maintain off-row data generated during data operations utilizing page affinity considerations where the off-row data is stored at the same page server as the data in the operations which allows a single page server to successfully read and/or provide data associated with an operation without failing back to the compute node.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 5A:
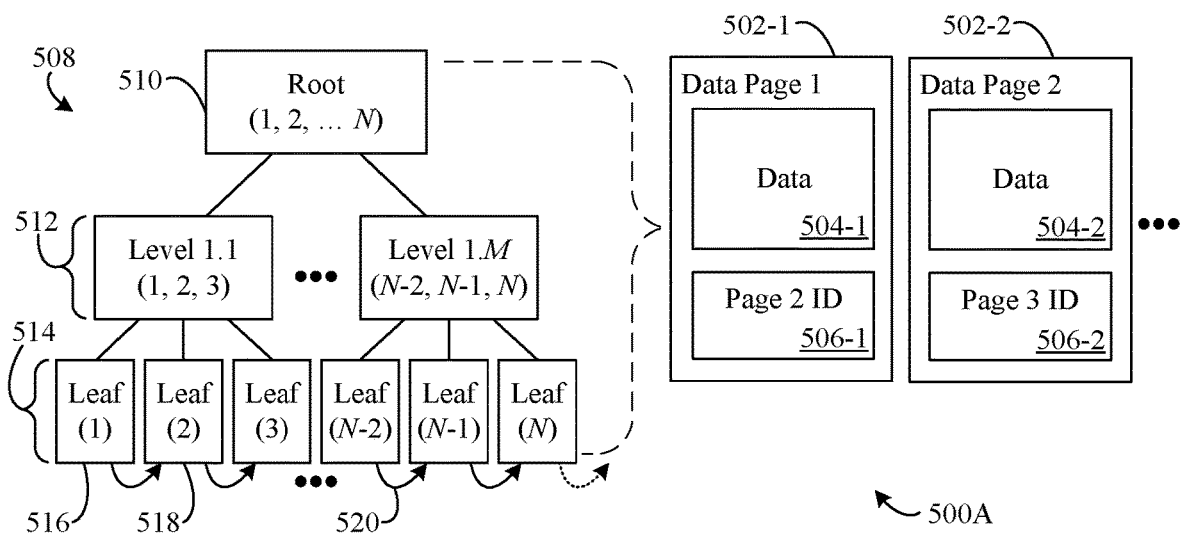
Figure 5B:
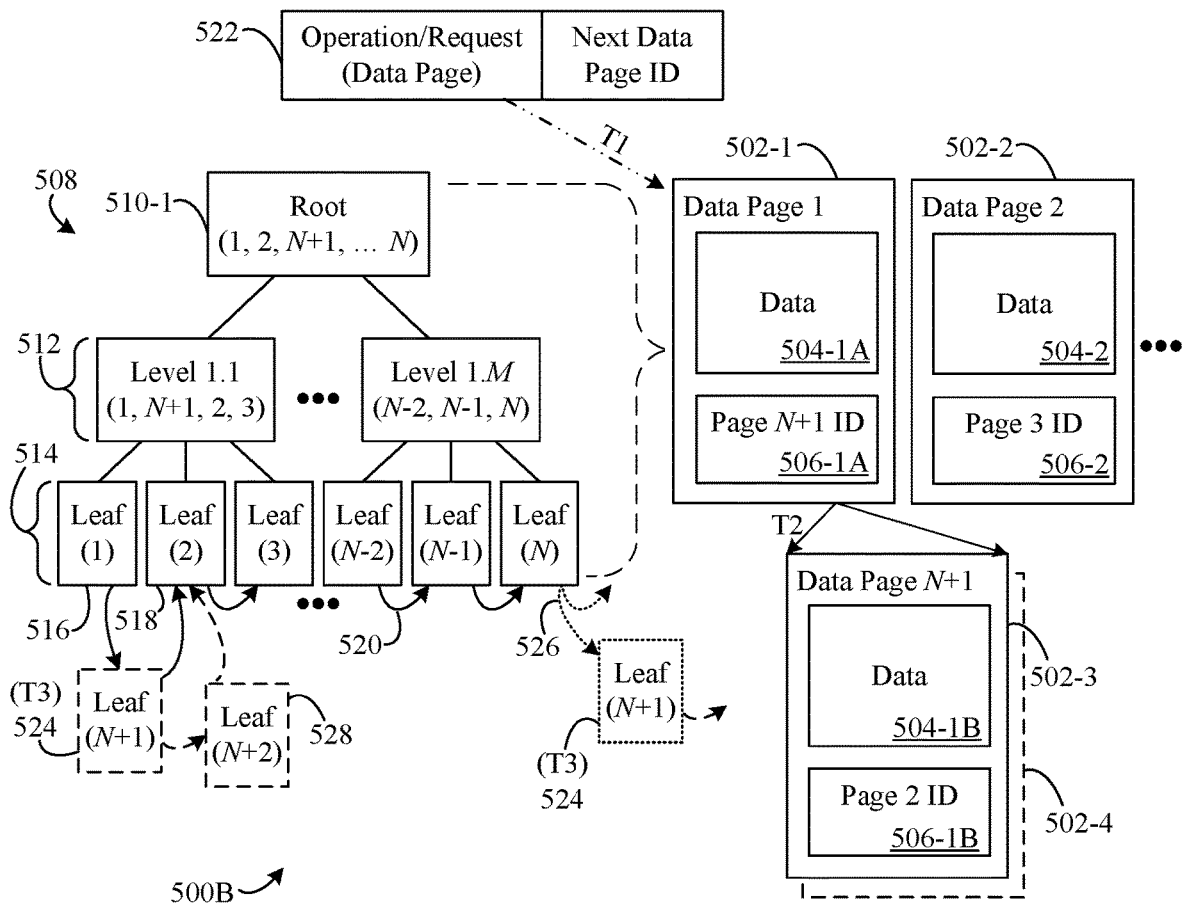
Figure 5C:
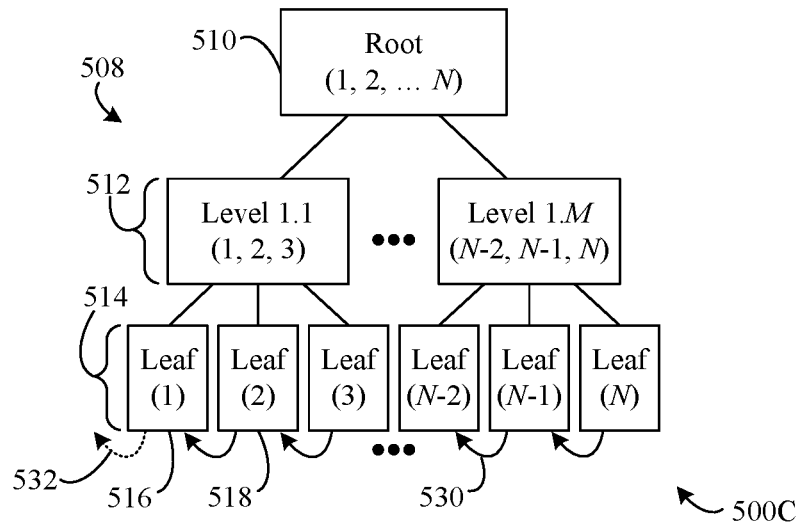

FIG. 5A, FIG. 5B, and FIG. 5C show block diagram representations of data pages and a page index for page split detection and affinity in query processing pushdowns, in accordance with an example embodiment.

Figure 6:
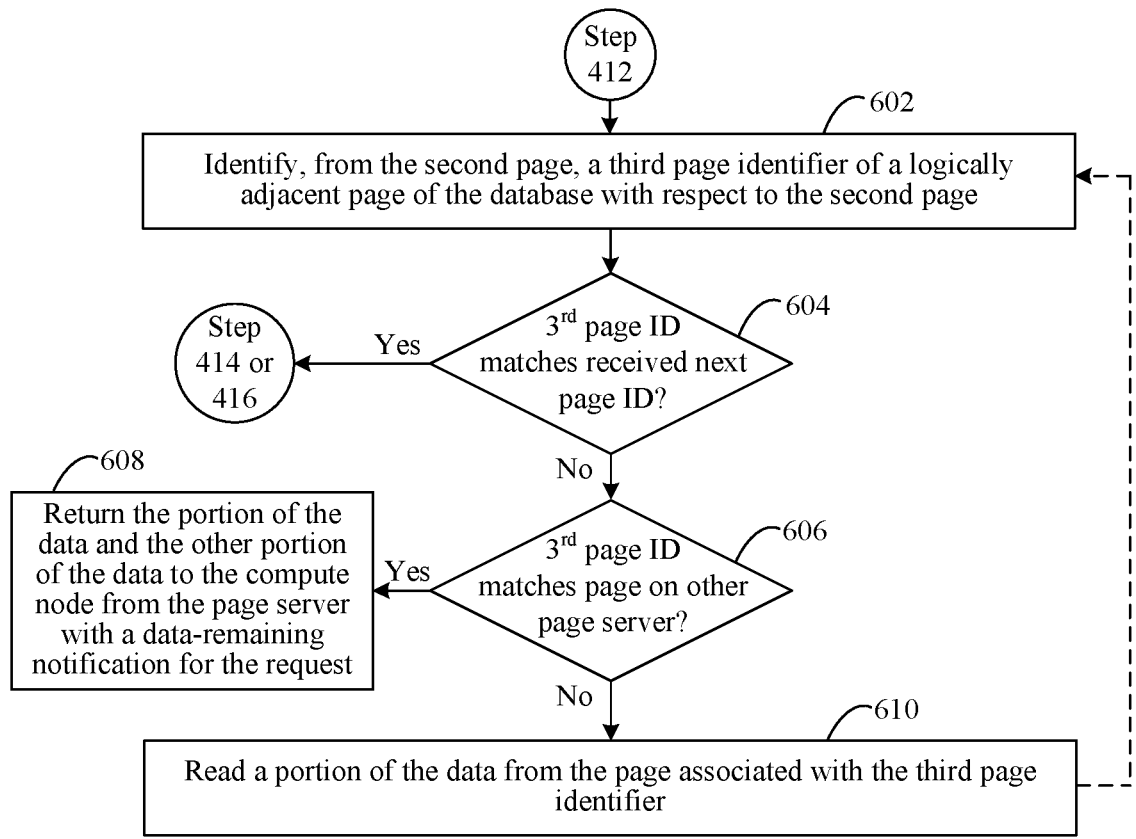

FIG. 6 shows a flow diagram for page split detection and affinity in query processing pushdowns, in accordance with an example embodiment.

Figure 7:
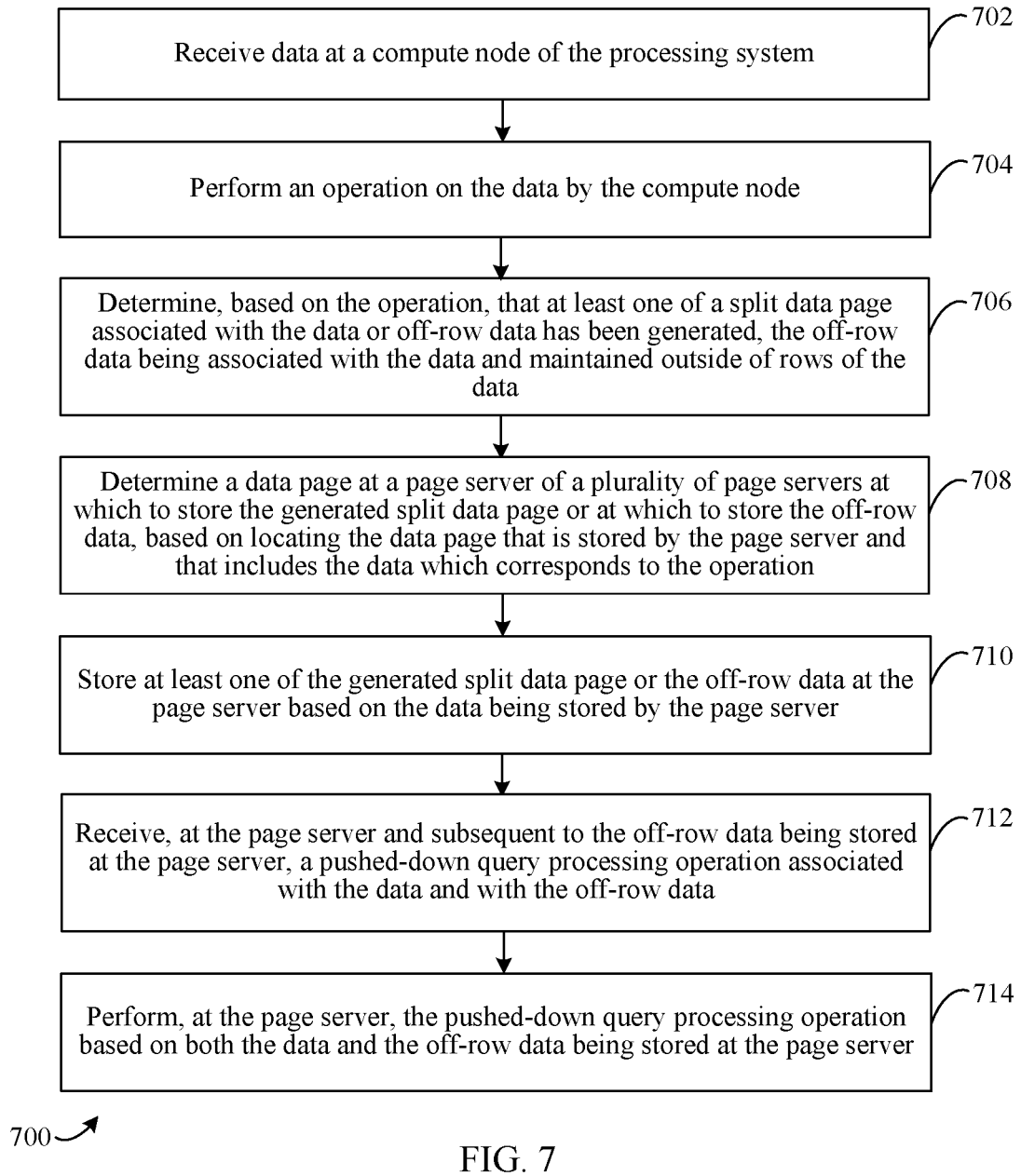

FIG. 7 shows a flowchart for page split detection and affinity in query processing pushdowns, in accordance with an example embodiment.

Figure 8:
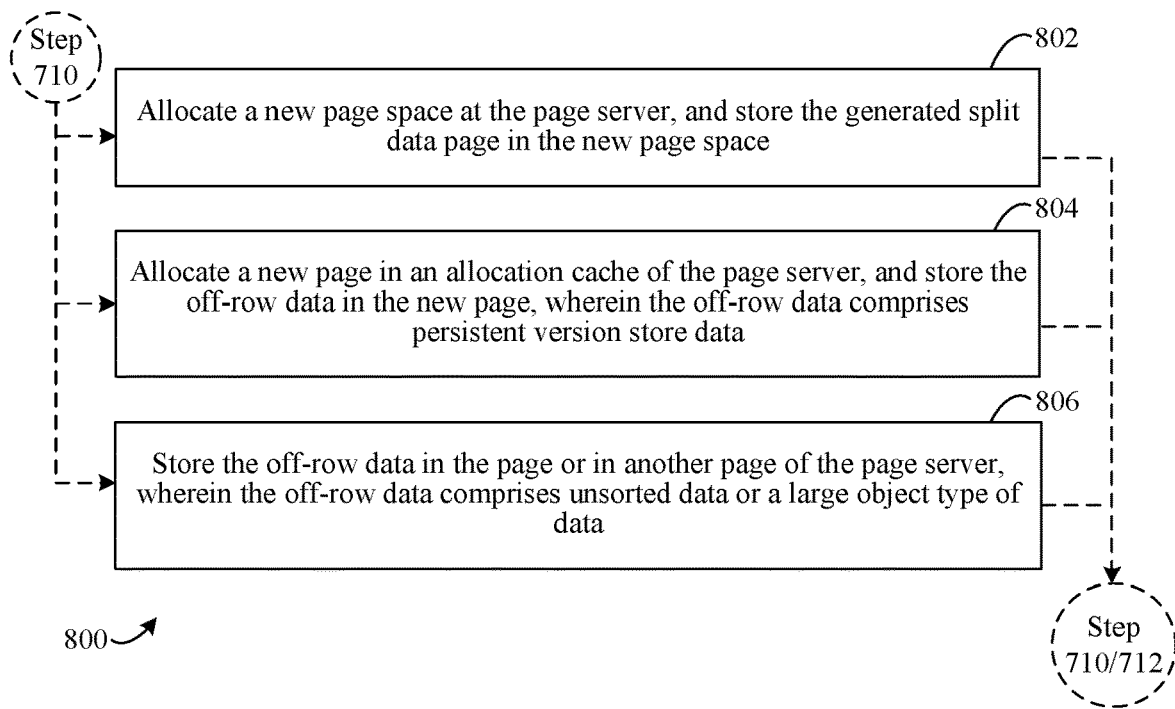

FIG. 8 shows a flowchart for page split detection and affinity in query processing pushdowns, in accordance with an example embodiment.

Figure 9:
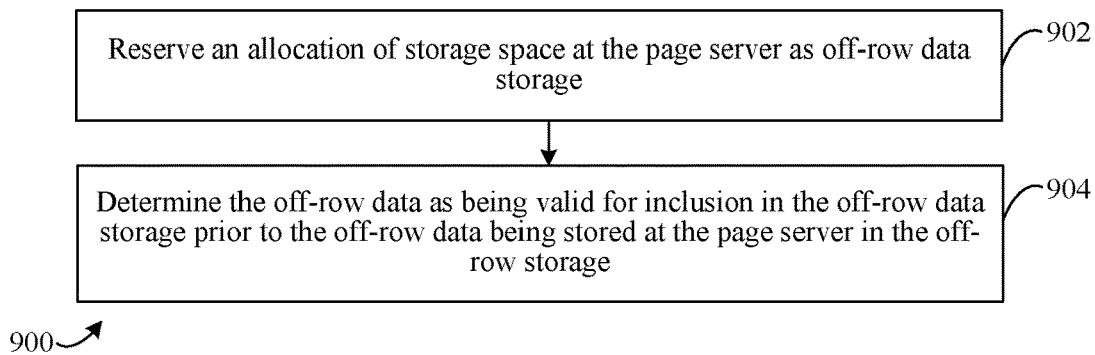

FIG. 9 shows a flowchart for page split detection and affinity in query processing pushdowns, in accordance with an example embodiment.

Figure 10:
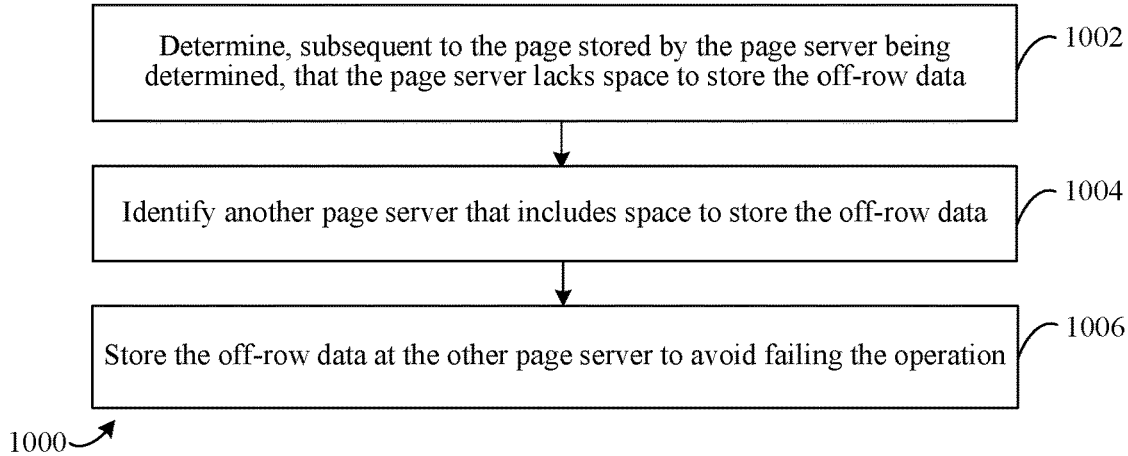

FIG. 10 shows a flowchart for page split detection and affinity in query processing pushdowns, in accordance with an example embodiment.

Figure 11:
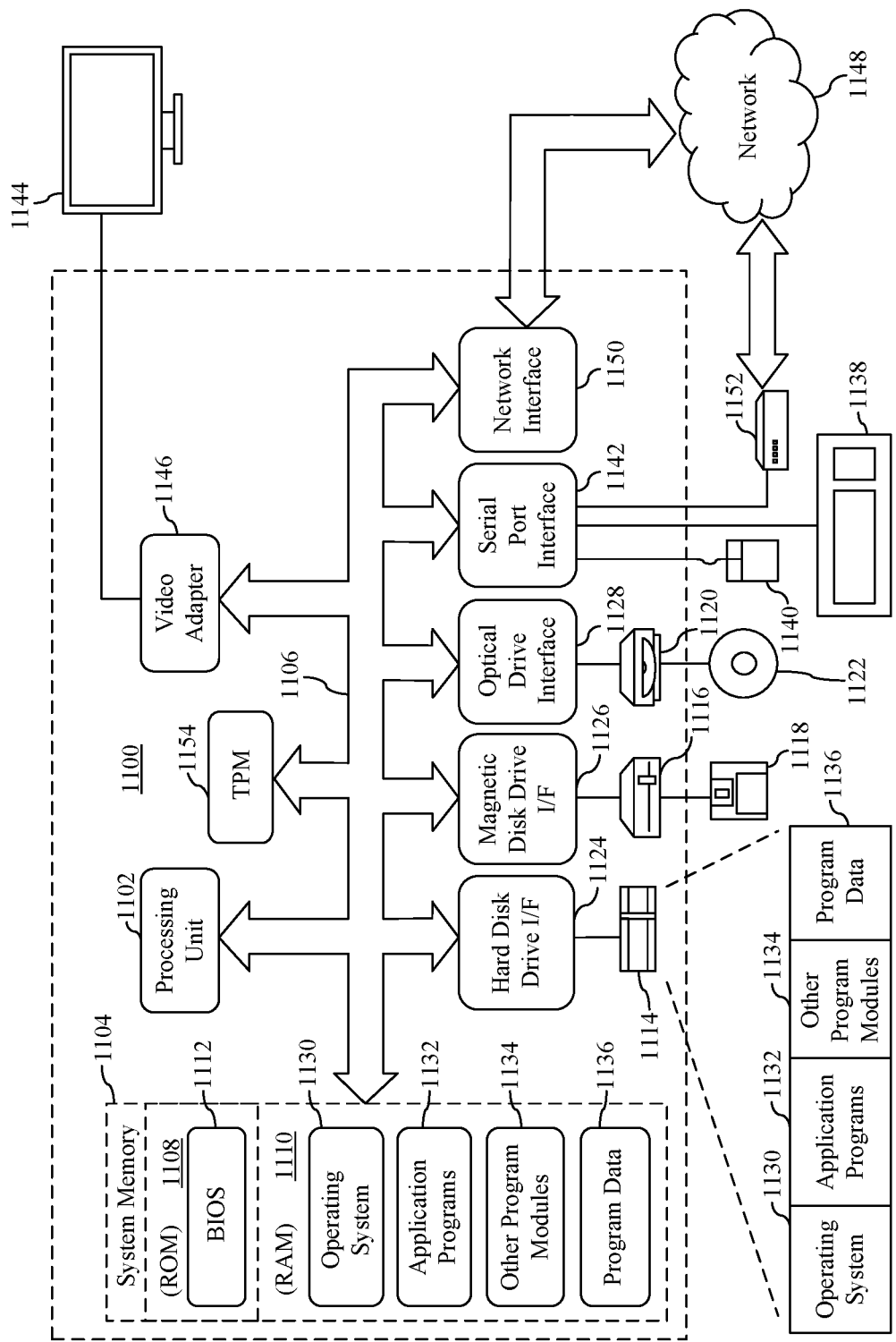

FIG. 11 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for page split detection and affinity in query processing pushdowns. Section III below describes example computing device embodiments that may be used to implement features of the embodiments described herein. Section IV below describes additional examples and advantages, and Section V provides some concluding remarks.

II. Example Embodiments for Page Split Detection and Affinity in Query Processing Pushdowns Embodiments herein provide for page split detection and affinity in query processing pushdowns. One example implementation of these embodiments is a distributed processing system that performs query processing for large, scalable database operations. It should be noted, however, that these example implementations are not limiting, but rather, are illustrative in nature. In the context of distributed embodiments, a database/computing system includes several distributed components, including one or more compute nodes, multiple page servers, a log service, and storage. As an example, embodiments may be implemented in Azure® SQL Database from Microsoft Corporation of Redmond, WA The distributed architectures under the embodiments herein enable databases of large sizes, such as those exceeding 100 TB, to perform fast database restores, to perform near-instantaneous backups, and to rapidly scale up and down.

In existing distributed solutions, compute nodes handle all incoming user queries and query processing activities, where page servers provide a storage engine with each page server maintaining a set or subset of data pages for a database. The role of a page server in existing solutions is limited to serving pages out to compute nodes and to keeping data pages (also "pages" herein) up-to-date based on ongoing transaction activity.

However, in contrast to existing systems, embodiments herein enable page servers to perform pushdown operations for query processing that for which page servers were not previously capable. The methods and systems described herein allow for online transaction processing (OLTP) and hybrid transaction and analytical processing workloads (HTAP) that enables high throughput transaction systems that also require real-time analytics. This is accomplished according to the embodiments herein by improving system efficiencies and the handling of processing operations via pushdowns to page servers, as will be described in detail below.

For example, in OLTP-tuned systems, the embodiments herein are configured to operate in improved and efficient ways that match the performance characteristics of business critical systems, and for analytical workloads that are scan-intensive over very large data sets, the distributed nature and operations of the systems and methods herein does not disadvantage performance in comparison to existing business critical, single-system implementations that use locally-associated solid state drives for maintaining data, because embodiments provide for more efficient configurations and capabilities of the described distributed systems herein. That is, the described embodiments efficiently handle HTAP workloads by leveraging available page server(s) compute resources and minimizing remote input/output (I/O) data page movement within the computing system, which current solutions cannot do.

As an example, consider the following analytical query against a table of a database with 1.5B (billion) rows that cannot leverage existing indexes for a seek operation. This query is looking for the average stock sale for transaction commissions greater than $95.00:

SELECT AVG([T_TRADE_PRICE]*[T_QTY]) AS [Average Sale Amt]
FROM [dbo].[TRADE]
WHERE [T_COMM]>95.00;

Assuming there are 245,598 rows in the table where the commission is higher than $95.00, a typical processing system must have a selective filter that considers the overall size of the table. However, because T_COMM is not the leading column of an existing index in table "TRADE," the compute node of the system must scan each row in the table to perform the query, according to prior solutions. For a large table, such as in this example, that requires scanning to process a query, the compute node must issue several requests for remote I/O data fulfillment from the page server(s) to the compute node. The required data pages are first loaded from the page server(s) into memory on the compute node which then must process the filter on each row. This means that page servers of the computing system that are associated with the table must provide a very large amount of data over the network that will consume correspondingly large amounts of memory at the compute node, as well as correspondingly large processing resources. In this example, for the 1.5B row table, approximately 30M (million) pages are retrieved by the page server(s), provided over the network to the compute node, and stored in memory of the compute node which then scans/filters all 1.5B rows in the provided 30M pages to complete the query operation.

In contrast to the performance of the query operation by prior solutions, the embodiments herein provide moving, e.g., the scan/filter operations to the page server(s), thus achieving a "pushed" or "pushdown" filter that provides a number of system benefits, including but not limited to, moving fewer data pages to the compute node from the page servers, reducing network traffic from the page servers to the compute node, reduce I/O requirements on the compute node, reduce memory and RBPEX ("resilient buffer pool extension") pressure that occurs flooding the compute node buffer cache, and improving the handling of concurrent OLTP workloads on the compute node by offloading or pushing-down processing of scan-intensive HTAP queries to the page server(s). Thus, taking the example filter/query from above, but in the context of the described embodiments, the page server(s) retrieve, scan, and filter the 1.5B rows of data from the 30M data pages, and in turn, only provide the 245,598 rows in the table to the compute node which can then simply aggregate the rows of data in cases where the rows are provided from different page servers.

Simply put, embodiments herein leverage spare processing capacity of the allocated page servers to apply filters and other perform other types of pushdown operations. In addition to the computing system performance improvements achieved, as noted above, the primary customer experience will also be improved greatly over prior solutions via query performance for analytical queries. While not so limited, examples of application for the described embodiments include workload types such as HTAP (e.g., a mix of OLTP and OLAP (online analytical processing)); large data sizes such as very large tables, including tables that exceed the capacity of the buffer cache maximum size for a compute node (which would otherwise result in many remote page server I/O operations); different issues related to page affinity for various data structures such as pushed operations against heaps, B-trees, and column store indexes, as well as detecting page splits by page servers during data page reads; eligible data operations such as row mode filters for non-sargable predicates and row mode bitmap filters, SELECT operation list expressions and row mode scalar aggregation pushdowns, and batch mode filters and aggregations.

Therefore, benefits from improved query performance for analytical queries against large data sets are realized by the described embodiments. Eligible queries return rows of data to the compute node(s) instead of full data pages, and thus reduce memory pressure (e.g., no data pages are pushed to buffer pool, as well as reduced memory pressure and evictions of existing pages). Several aspects of improvements provided by the embodiments herein, as noted above, are not to be considered limiting.

Page split detection and affinity in query processing pushdowns are described below as comprising a portion of the overall processes and benefits provided by the described embodiments. Methods for page split detection and affinity in query processing pushdowns are performed by systems and devices. Page servers perform pushdown operations based on specific, and specifically formatted and/or generated, information, instructions, and data provided thereto from a compute node. Pushdown operations are processing operations that would normally be performed by a compute node. Page servers also determine that page splits have occurred during the reading of data pages maintained by the page servers during pushdown operations, and also during fulfillment of compute node data requests. To detect that a data page has split, page servers utilize information provided from a compute node that relates to an expected next data page, associated with the data page, which is compared to a next data page maintained in the page server page index. A mismatch in the comparison determined by the page servers indicates that a data page was split. The embodiments herein provide for a page server to be enabled to quickly, and accurately, determine that a page split of a data page maintained by the page server has occurred, and to extend fulfillment of a read request for the data of the data page to the new data page generated by the split without having to fail back to the compute node, or provide incomplete data for the request along with a notification for the compute node that there is data remaining to be read on a different page server. That is, because data page splits can be detected during reads by the page server, the page server will not simply stop after reading the page that was split, which would cause a return of incomplete data-instead, the page server detects the split and continues to read data associated with the read operation from another data page.

Compute nodes and page servers also store and maintain off-row data generated during data operations utilizing page affinity considerations where the off-row data is stored at the same page server as the data in the operations which allows a single page server to successfully read and/or provide data associated with an operation without failing back to the compute node.

Embodiments herein are described in the context of query processing and query processing pushdowns as non-limiting and exemplarily illustrative examples, including various types of operations performed in association with query processing and query processing pushdowns, such as page split detection and page affinity for new data pages and off-row data. However, embodiments herein are not so limited, and their principles and functions are applicable to other types of processing task, applications, and/or services, in which offloading of operations from a primary computing system may be advantageously implemented.

Accordingly, methods for page split detection and affinity in query processing pushdowns are performed by systems and devices. The embodiments herein provide solutions that improve processing loads and efficiency in systems of compute nodes and page servers, reduces memory pressure at compute nodes, and greatly reduce network bandwidth usage between compute nodes and page servers. These and other embodiments for page split detection and affinity in query processing pushdowns will be described in further detail below in association with the Figures, and in the Sections/Subsections that follow.

Figure 1A:
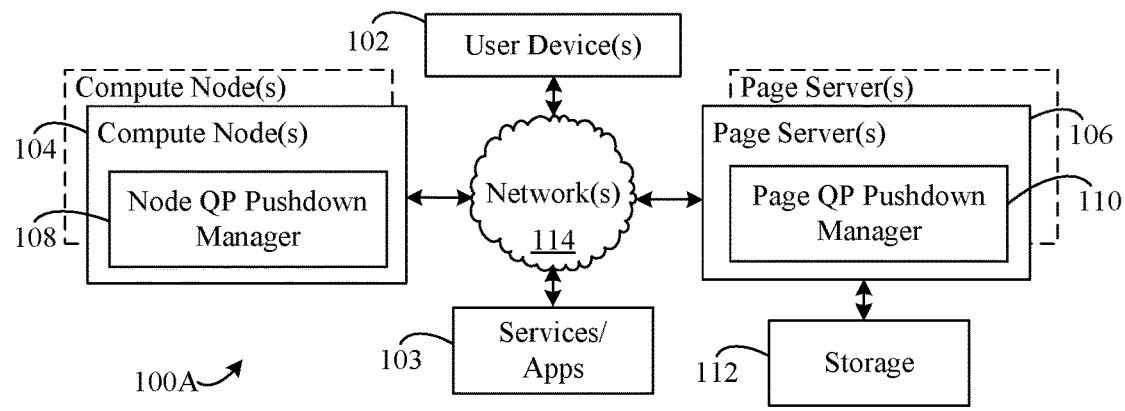
FIG. 1A shows a block diagram of a system for page split detection and affinity in query processing pushdowns, according to an example embodiment.
Figure 1B:
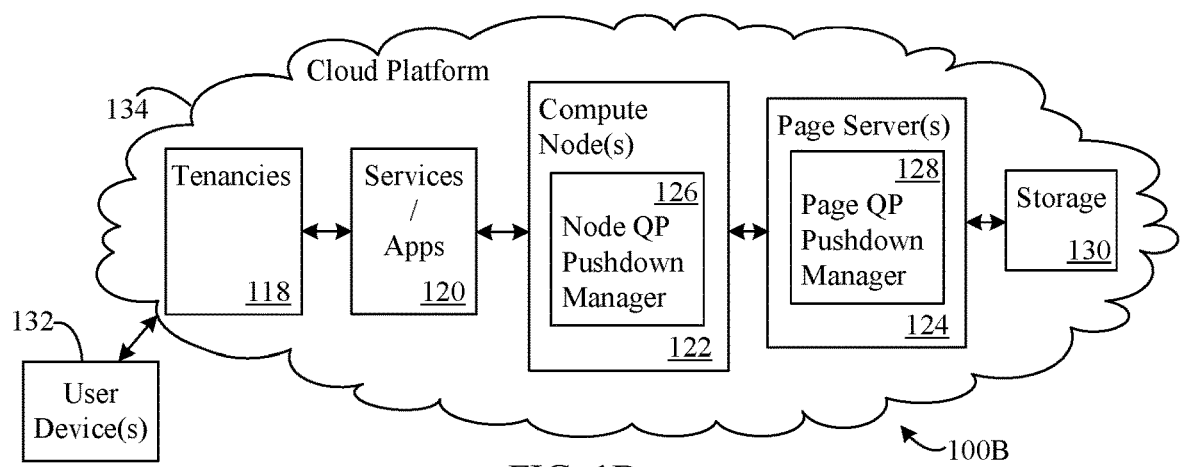
FIG. 1B shows a block diagram of a cloud-based system for page split detection and affinity in query processing pushdowns, according to an example embodiment.

Systems, devices, and apparatuses may be configured in various ways for page split detection and affinity in query processing pushdowns. For instance, FIG. 1A and FIG. 1B will now be described. FIG. 1A shows a block diagram of a system 100A, and FIG. 1B shows a block diagram of a cloud-based system 100B, each configured for page split detection and affinity in query processing pushdowns, according to embodiments.

As shown in FIG. 1A, system 100A includes user device(s) 102 (also user device 102 herein), services/applications host 103, a compute node(s) 104, and a page server(s) 106. In embodiments, user device 102, services/applications host 103, compute node(s) 104, and page server(s) 106 communicate with each other over a network 114. A storage 112 is also shown in communication with page server(s) 106. It should be noted that in various embodiments, different numbers of user devices, hosts, compute nodes, page servers, and/or storages are present. Additionally, according to embodiments, any combination of the systems and/or components illustrated in FIG. 1A are present in system 100A.

Network 114 comprises different numbers and/or types of communication links that connect computing devices and hosts/servers such as, but not limited to, the Internet, wired or wireless networks and portions thereof, point-to-point connections, local area networks, enterprise networks, cloud networks/platforms, and/or the like, in embodiments. In an example, network 114 may be a cloud-based platform network and/or enterprise network through which a user device or other computing system connects to or accesses a service/application that may in turn cause performance of operations by compute nodes and page servers on data persisted in a data storage.

Storage 112 may be any type and/or number of data storage devices or systems, and may comprise internal and/or external storage in various embodiments. While storage 112 is shown in communication with page server(s) 106, in some embodiments, storage 112 may be connected to network 114, or may comprise a portion of page server(s) 106. Storage 112 may comprise a monolithic storage device/system, a cloud-based storage system, a distributed storage system, and/or the like.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for page split detection and affinity in query processing pushdowns, e.g., providing queries to a database (DB) server of services/applications host 103, as well as for performing client-side functions/operations of client-server scenarios. User device 102 also includes additional components (not shown for brevity and illustrative clarity) including, but not limited to, components and subcomponents of other devices and/or systems herein, in various embodiments.

User device 102 may be a computing device associated with a domain which, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

Services/applications host 103 comprises one or more server computers or computing devices, such as an on-premises server(s) in addition to, or in lieu of, cloud-based servers. Services/applications host 103 may host one or more services or applications, as would be understood by persons of skill in the relevant art(s) having the benefit of this disclosure, and may act as a portal or interface for users/tenants using user device(s) 102 by which access to compute node(s) 104 is obtained. In some embodiments, services/applications host 103 may host a DB server front end that utilizes compute node(s) 104 and page server(s) 106 as a back end.

Compute node(s) 104 comprises one or more server computers or computing devices, such as an on-premises server(s) in addition to, or in lieu of, cloud-based servers. Compute node(s) 104, as shown, include anode query processing (QP) pushdown manager 108. Node QP pushdown manager 108 is configured to determine and provide modified operations, operation fragments, modified metadata, page indexes associated with data pages for operations, and/or the like in the context of QP pushdowns to page server(s) 106. Node QP pushdown manager 108 may also be configured to receive data, from data pages managed by page server(s) 106, and in embodiments, some such data may be processed by page server(s) 106 based on QP pushdown requests provided to page server(s) 106 from node QP pushdown manager 108. In such embodiments, node QP pushdown manager 108 provides this processed data to a query processor or operations processor of compute node(s) 104 (described in further detail below) for performing QP operations at compute node(s) 104.

Page server(s) 106 comprises one or more server computers or computing devices, such as an on-premises server(s) in addition to, or in lieu of, cloud-based servers. Page server(s) 106, as shown, include a page query processing (QP) pushdown manager 110. Page QP pushdown manager 110 is configured to determine/detect page splits in data pages during performance of operations such as reading data from data pages, and to continue performance of such read operations on new data pages generated by page splits after existing data pages are read, according to embodiments. Page splits may be determined by Page QP pushdown manager 110 based at least on page indexes maintained by compute node(s) 104. In some embodiments, page QP pushdown manager 110 is configured to detect page splits when page indexes of data pages maintained by page server(s) 106 have not yet been updated to reflect changes caused by a page split. Page QP pushdown manager 110 may also be configured to perform QP pushdown operations in accordance with requests therefor from node QP pushdown manager 108, in embodiments, and is configured to store new data pages and off-row data generated by operations based on page affinity, as described herein.

It should also be noted that embodiments herein contemplate that compute node(s) 104, page server(s) 106, storage 112, and/or services/applications host 103 may comprise a portion of an enterprise network portion of network(s) 114 with which user device(s) 102 communicate over the Internet.

Turning now to FIG. 1B, system 100B is a cloud-based embodiment of system 100A of FIG. 1A. As shown, system 100B includes a cloud platform 134. In embodiments, cloud platform 134 is a cloud-based platform such as Microsoft® Azure® from Microsoft Corporation of Redmond, WA, that is accessible by one or more users of user device(s) 132 (also user device 132 herein) over a network (not shown here for illustrative clarity and brevity).

User device 132 may be any type and/or number of user device, such as devices similar to those described for user device 102 in FIG. 1A, and may correspond to tenants and/or end users, IT personnel, administrators of systems described herein, of different domains, such as different tenancies within cloud platform 134.

A tenant in the context of FIG. 1B is a representation of an organization in a cloud platform. The domain of the tenant in the cloud platform is its tenancy in which the tenant registers and manages applications, stores data/files, accesses services, etc., hosted by cloud platform 134. Cloud platform 134 is illustrated as hosting tenancies 118 which comprises one or more tenants. Tenants are enabled to provide applications/services, hosted by cloud platform 134, to users such as end users of tenancies 118. In doing so, a tenant may lease or purchase the use of system resources within cloud platform 134 for such hosting and may utilized system resources and/or operations for providing their services to end users.

For instance, cloud platform 134 may host a tenant of tenancies 118 (which may include partners and/or service providers of the owner of cloud platform 118), that provides services for a DB server of services/applications 120 (also "services/apps" 120 herein) of cloud platform 134, in embodiments. Users of user device(s) 132 having credentials for ones of tenancies 118 are allowed to authenticate for this tenancy and access data, information, services, applications, etc., e.g., services/apps 120 of cloud platform 134, allowed or instantiated for the tenant.

Compute node(s) 122 and node QP pushdown manager 126 may be respective embodiments of compute node(s) 104 and node QP pushdown manager 108 of FIG. 1A, in the context of cloud platform 134. Page server(s) 124 and page QP pushdown manager 128 may be respective embodiments of page server(s) 106 and page QP pushdown manager 110 of FIG. 1A, in the context of cloud platform 134. Storage 130 may be an embodiment of storage 112 of FIG. 1A, in the context of cloud platform 134.

Cloud platform 134 includes one or more distributed or "cloud-based" servers, in embodiments. That is, cloud platform 134 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 134 is configured to support multi-tenancy as noted above, where cloud platform-based software services multiple tenants, with each tenant including one or more users who share common access to certain software services and applications of cloud platform 134, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Portions of FIGS. 1A and 1B, and system 100A and system 100B respectively, such as compute node(s) 104 and/or 122, page server(s) 106 and/or 124, storage 112 and/or 130, and/or cloud platform 134 also include additional components (not shown for brevity and illustrative clarity) including, but not limited to, components and sub-components of other devices and/or systems herein, e.g., an operating system, as shown in FIG. 11 described below, in embodiments.

Additionally, as would be understood by persons of skill in the relevant art(s) having the benefit of this disclosure, system 100A and system 100B illustrate embodiments in which system resources utilized for applications and/or services, such as DB server hosting, may be scaled out on demand or as needed to any size, throughput, capacity, etc., and the embodiments herein provide for the pushdown of operations to page servers that were up until now performed exclusively by compute nodes, and also provide for specific handling of different operations and functions by compute nodes and/or page servers to successfully and accurately perform these pushdown operations. Non-limiting examples of such specific handling include, without limitation, the detection of page splits at page servers caused by concurrent operations generating/changing data in a data page after a request to read the page is received by the page server and prior to the data page being read, page affinity for managing off-row data, and/or the like as described herein.

Systems, devices, and apparatuses are configured in various ways for page split detection and affinity in query processing pushdowns, in embodiments. For instance, FIGS. 2 and 3 will now be described in this context.

Figure 2:
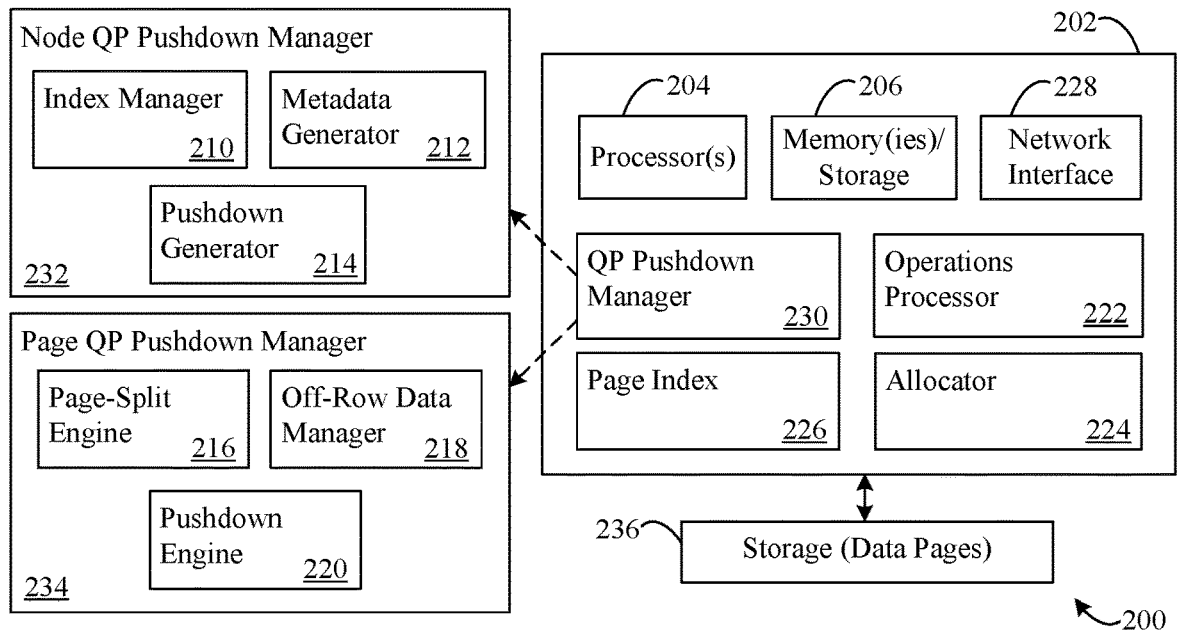
FIG. 2 shows a block diagram of a computing system configured for page split detection and affinity in query processing pushdowns, according to an example embodiment.
Figure 3:
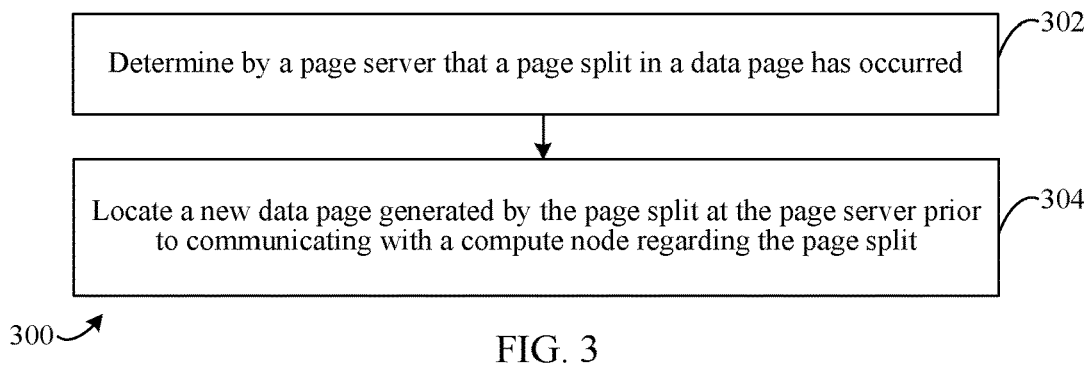
FIG. 3 shows a flowchart for page split detection and affinity in query processing pushdowns, in accordance with an example embodiment.

Referring first to FIG. 2, a block diagram of a system 200 is shown for page split detection and affinity in query processing pushdowns, according to an example embodiment. System 200 as exemplarily illustrated and described is configured to be an embodiment of system 100A of FIG. 1A and/or system 100B of FIG. 1B. FIG. 3 shows a flowchart 300 for page split detection and affinity in query processing pushdowns, according to an example embodiment. System 200 may be configured to operate in accordance with flowchart 300. System 200 is described as follows.

System 200 includes a computing system 202 which is any type of server or computing system, as mentioned elsewhere herein, or as otherwise known, including without limitation cloud-based systems, on-premises servers, distributed network architectures, and/or the like, and may be configured as a compute node and/or as a page server, in various examples as described herein. As shown in FIG. 2, computing system 202 includes one or more processors ("processor") 204, one or more of a memory and/or other physical storage device ("memory") 206, as well as one or more network interfaces ("network interface") 228. In embodiments, computing system 202 also includes a query processing (QP) pushdown manager 238 that is an embodiment of one or more of node QP pushdown manager 108 of FIG. 1A, node QP pushdown manager 126 of FIG. 1B, page QP pushdown manager 110 of FIG. 1A, and/or page QP pushdown manager 128 of FIG. 1B. Computing system 202 may also include an operations processor 222, an allocator 224, and one or more page indexes 226. System 200 includes a storage 236 that includes data pages, or portions thereof, in embodiments, and may be configured as, or similarly as, storage 112 of FIG. 1A and/or storage 130 of FIG. 1B.

It is contemplated herein that any components of system 200 may be grouped, combined, separated, etc., from any other components in various embodiments, and that the illustrated example of system 200 in FIG. 2 is non-limiting in its configuration and/or numbers of components, as well as the exemplary arrangement thereof.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., one or more types/numbers of caches for query processing, allocations for data storage, etc.), remote processors or memories, and/or distributed processors or memories. Processor 204 may be multi-core processors configured to execute more than one processing thread concurrently. Processor 204 may comprise circuitry that is configured to execute and/or process computer program instructions such as, but not limited to, embodiments of QP pushdown manager 230, including one or more of the components thereof as described herein, which may be implemented as computer program instructions, as described herein. For example, in performance of/operation for flowchart 300 of FIG. 3, processor 204 may execute program instructions as described. Operations processor 222 may be a query processor or a portion of a DB server, in embodiments, configured to perform DB operations such as performing queries against a DB. Operations processor 222 may comprise program instructions that are carried out by processor 204, in embodiments, or may be a hardware-based processing device as described herein.

Memory 206 includes volatile storage portions such as a random access memory (RAM) and/or persistent storage portions such as hard drives, non-volatile RAM, and/or the like, to store or be configured to store computer program instructions/code for page split detection and affinity in query processing pushdowns, as described herein, as well as to store other information and data described in this disclosure including, without limitation, embodiments of QP pushdown manager 230, including one or more of the components thereof as described herein, and/or the like, in different implementations contemplated herein. Memory 206 also includes storage of page index(es) 226, which includes an index of data pages associated with databases that identifies parent and leaf data page structures as well as page servers that maintain particular data pages, in embodiments, allocation caches as described herein, as well as data utilized and/or generated in performance of operations/functions noted herein, and/or the like, such as metadata, etc. In the context of a compute node, page index 226 may include information regarding each of the page servers associated with maintaining data pages of the DB, while in the context of a page server, page index 226 may include information regarding the data pages of the DB maintained by the page server.

Allocator 224 is configured to manage allocation of storage space for new data pages and associated page index modifications, as well as for off-row data, to improve page affinity for related data and performance of QP pushdown operations. As noted above, memory 206 includes one or more allocation caches in embodiments that are allocated to store persistent version store pages having data/information associated with different versions of a DB, as well as other data such as other off-row data. In embodiments, each instance of a compute node or a page server may include its own allocation cache, and in some embodiments, multiple instances of allocation caches may be implemented as corresponding to different DB files/objects associated with or maintained by a compute node or a page server. Allocator 224 is configured to manage allocation caches and the storage of data therein, and may include sub-units for management of persistent version store (PVS) data pages, small large object (SLOB) pages (e.g., secondary page overflow), unordered collections of rows such as heap forwarded rows, and new data pages and associated page index modifications.

Storage 236 may comprise a portion of memory 206, and may be internal and/or external storage or any type, such as those disclosed herein. In embodiments, storage 236 stores one or more data pages that comprise a DB object or DB file. When configured to function as a page server, system 200 stores any number of data pages in storage 236. Additionally, more than one page server may be implemented via multiple instances of system 200, and data pages of a DB object or DB file may be large enough in number and/or data size such that data pages of a single DB object or DB file span multiple instances of storage 236 across multiple, respective page servers. In embodiments where system 200 is configured to function as a compute node, storage 236 stores data pages and/or portions of data pages provided from one or more pages servers responsive to requests from the compute node. In embodiments, storage 236 may also include allocation caches as described herein.

Network interface 228 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG. 1A and/or system 100B in FIG. 1B, over a network/cloud platform such as network 112 and/or cloud platform 134.

System 200 also includes additional components (not shown for brevity and illustrative clarity) including, but not limited to, components and subcomponents of other devices and/or systems herein, as well as those described below with respect to FIG. 11, e.g., an operating system, etc., according to embodiments.

In embodiments, computing system 202 may be configured as a compute node and/or as a page server, and QP pushdown manager 230 of computing system 202 may be corresponding configured in such embodiments. That is, QP pushdown manager 230 may be configured as a node QP pushdown manager and/or as a page QP pushdown manager. Accordingly, QP pushdown manager 230 may be implemented in various ways to include a plurality of components for performing the functions and operations described herein for page split detection and affinity in query processing pushdowns, in a compute node context and/or in a page server context.

As illustrated, system 200 of FIG. 2 shows two non-exclusive options for configuring QP pushdown manager 230: a node QP pushdown manager 232 and a page QP pushdown manager 234. Node QP pushdown manager 232 includes, without limitation, an index manager 210, a metadata generator 212, and a pushdown generator 214. Page QP pushdown manager 234 includes, without limitation, a page split engine 216, an off-row data manager 218, and a pushdown engine 220, although additional components, as described herein or otherwise, are also included and some components may be excluded, in various embodiments. Additionally, features described for compute nodes may be included in page server embodiments, and vice versa.

Referring to node QP pushdown manager 232, index manager 210 is configured to determine indexes of data pages required for QP and/or QP pushdown operations based on page index 226. In embodiments, this may include next data pages associated with data pages to be read by a page server. Metadata generator 212 is configured to determine metadata needed for, and to generate versions of metadata and/or modify metadata associated with a DB for, performing different operations described herein such as QP pushdown operations to be performed by a page server. In embodiments, metadata generator 212 is configured to serialize metadata required for operations as provided to a page server. Pushdown generator 214 is configured to generate pushdown operations at a compute node for provision to a page sever. In embodiments, pushdown generator 214 generates query fragments (e.g., including query operators, expressions, etc.) that, along with appropriate metadata, are assembled to form query plans for QP pushdown operations performed by one or more page servers that would otherwise be incapable of performing the required QP pushdown operations.

Referring now to page QP pushdown manager 234, page-split engine 216 is configured to determine when a page split has occurred at a page server during a reading of the data page that was split. In embodiments, page-split engine 216 determines page splits based on a comparison between an expected next data page from page index 226 and a provided next data page from a compute node. Off-row data manager 218 is configured to determine that off-row data is generated in association with an operation on data from a data page, and to determine a storage location for the generated off-row data that provides page affinity with the data and/or other off-row data associated with the data. Pushdown engine 220 is configured to generate QP pushdown operations, from information provided by a compute node, such that operations processor 222 is enabled to process the operations.

Referring also now to FIG. 3, flowchart 300 begins with step 302. In step 302, it is determined by a page server that a page split in a data page has occurred. For example, referring again to system 200 in FIG. 2, as described above, page-split engine 216 is configured to perform step 302 of flowchart 300. That is, page-split engine 216 is configured to determine that a page split has occurred during the reading of a data page by a page server in which page-split engine 216 is included. Page-split engine 216 is configured to determine when a page split has occurred at a page server that is caused by concurrent operations generating/changing data in the data page to split the data page after a request to read the page is received by the page server but prior to the data page being read by the page server. Page-split engine 216 determines a page split has occurred by comparing a next data page identifier that is retrieved from page index 226 of the page server with an expected next data page identifier provided by the compute node that requests the data page be read. When the expected next data page identifier provided by the compute node does not match the next data page identifier in page index 226, page-split engine 216 identifies the occurrence of a page split for the data page.

Flowchart 300 of FIG. 3 continues with step 304. In step 304, a new data page generated by the page split is located at the page server prior to communicating with a compute node regarding the page split. For instance, page-split engine 216 of system 200 in FIG. 2 is configured to locate the new data page generated by the split. In this manner, data from the original data page that is now located at the new data page because of the split, in addition to the data that required the split to occur, are able to be read by the page server without missing this data (i.e., if only the originally-identified data page from the compute node request was read by the page server). The page server, based on page index 226 that includes the next data page based on the split, locates the new page and continues the operation to read the requested data that was only associated with the original data page initially, when the new data page is located at the page server. In some cases, a new data page generated in association with a page split may be stored at a different page server, and in such cases, the page server returns the portion of the data that was read from the original data page to the compute node with a data-remaining notification for the requested read based on the determination that the new data page is located at the different page server If the next data page identifier in page index 226, that is associated with the new data page, matches the expected next data page identifier provided by the compute node, page-split engine 216 determines that all data associated with the data page that was split has been read, and the operation of reading the data page concludes. The read data may then be used by the page server to perform one or more QP pushdown operations, or may be provided back to the compute node.

Accordingly, the embodiments herein provide for a page server to be enabled to quickly, and accurately, determine that a page split of a data page maintained by the page server has occurred, and to extend fulfillment of a read request for the data of the data page to the new data page generated by the split without having to fail back to the compute node or unknowingly provide incomplete data for fulfillment of a request.

As noted above for FIGS. 1A, 1B, 2, and 3, embodiments herein provide for page split detection and affinity in query processing pushdowns. System 100A of FIG. 1A, system 100B of FIG. 1B, and/or system 200 of FIG. 2 may be configured to perform functions and operations for such embodiments. It is further contemplated that the systems and components described above are configurable to be combined in any way. FIG. 4, FIG. 5A, FIG. 5B, FIG. 5C, and FIG. 6 will now be described.

Figure 4:
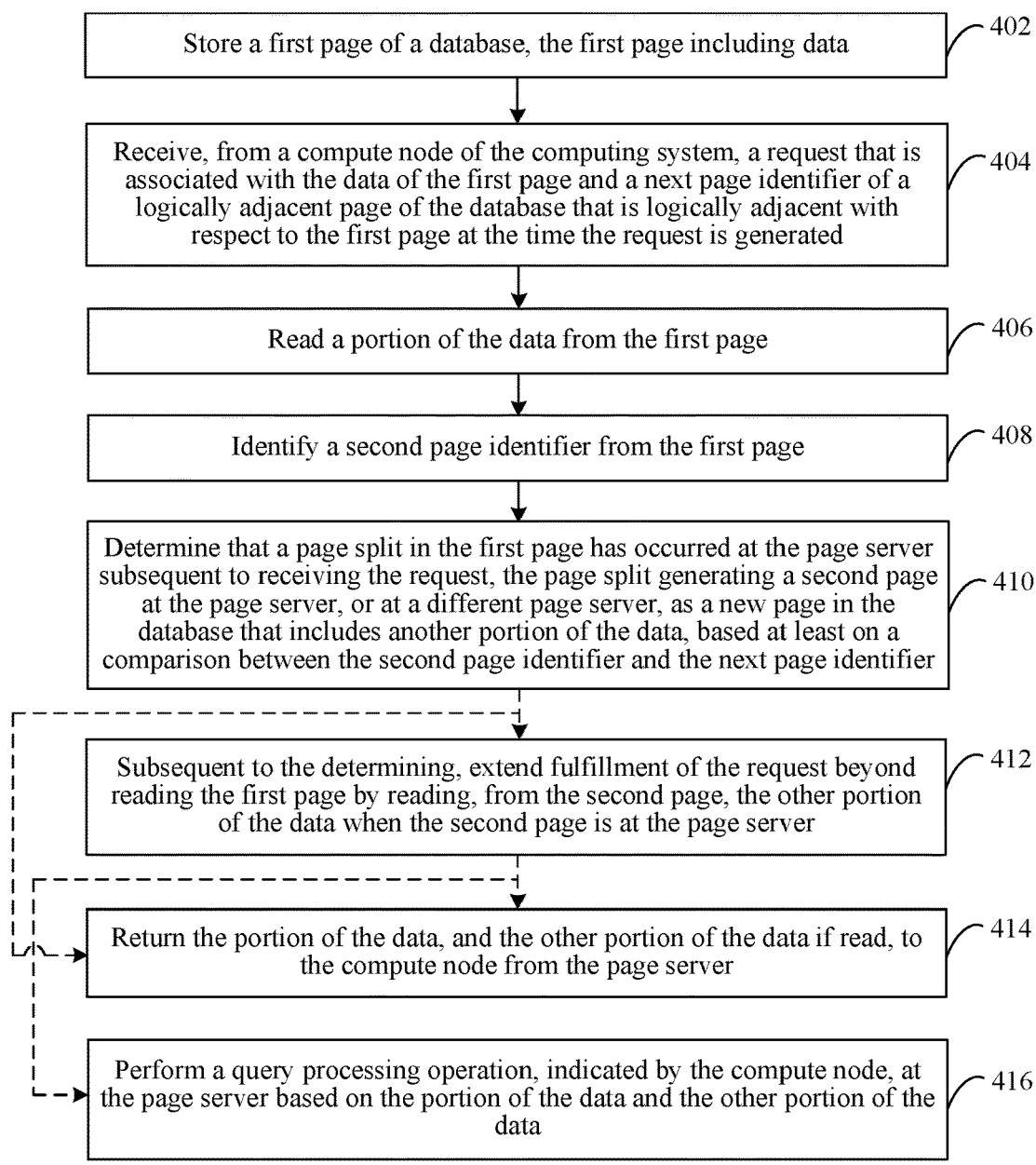
FIG. 4 shows a flowchart for page split detection and affinity in query processing pushdowns, in accordance with an example embodiment.

FIG. 4 shows a flowchart 400 for page split detection and affinity in query processing pushdowns, according to example embodiments. System 100A in FIG. 1A, system 100B in FIG. 1B, and/or system 200 in FIG. 2 are configured to operate according to flowchart 400, which may be an embodiment of flowchart 300 of FIG. 3. Further structural and operational examples will be apparent to persons skilled in the relevant art(s) based on the following descriptions. Flowchart 400 is described below in the context of system 100B in FIG. 1B and system 200 of FIG. 2, and with respect to FIG. 5A, FIG. 5B, FIG. 5C, and FIG. 6. It should be understood, however, the following description is also applicable to system 100A in FIG. 1A.

FIG. 5A, FIG. 5B, and FIG. 5C each show a block diagram representation of data page and a page index states comprising a page server system (system 500A, system 500B, and system 500C, respectively), and FIG. 6 shows a flow diagram 600, which may be an embodiment of flowchart 400, and which system 100A in FIG. 1A, system 100B in FIG. 1B, and/or system 200 in FIG. 2 are configured to operate in accordance with, in example embodiments for page split detection and affinity in query processing pushdowns.

Regarding FIG. 4, flowchart 400 begins with step 402. In step 402, a first page of a database is stored, the first page including data. For example, a page, or data page, of a data base may be stored and maintained at a page server, such as system 200 of FIG. 2 when so configured, and/or one of page server(s) 124 of system 100B in FIG. 1B. The data page may be stored in a storage such as storage 130 in FIG. 1B and/or storage 236 of FIG. 2, which are a portion of and/or maintained by pager server(s) 124 and computing device 202 when configured as a page server. The first page in step 402 may be one, or one of many, pages of a table in a database, and may be stored at the page server in various ways as would be understood by persons of skill in the relevant art(s).

Referring also to FIG. 5A and system 500A, a first data page 502-1 and a second data page 502-2 are shown in a first state for an example database of which a first data page, and in FIG. 5A also a second data page, have been stored at the page server (although different numbers data pages may be included as described above for system 200 of FIG. 2 when so configured and page server(s) 124 of system 100B in FIG. 1B). First data page 502-1 is illustrated as including data 504-1 and a page identifier (ID) of a next adjacent page in the database with respect to first data page 502-1, in this example a page 2 ID 506-1 that corresponds to second data page 502-2. Second data page 502-2 is illustrated as including data 504-2 and a page ID of a next adjacent page in the database with respect to second data page 502-2, in this example a page 3 ID 506-2 that corresponds to a third data page of the database, of N pages (not shown for brevity and clarity of illustration).

FIG. 5A and system 500A also include a page index 508 (e.g., as an embodiment of page index 226 in FIG. 2) that corresponds to the data pages of the database, including first data page 502-1 and second data page 502-2. Page index 508 is illustrated as indexing N data pages of the database maintained by system 500A. Page index 508 may be a hierarchical index, e.g., a B-tree structure, that includes a root index level 510 identifying data pages 1-N stored and maintained at system 500A, M first level indexes 512 (shown as Level 1.1 to Level 1.M, which may be referred to as sub-indexes), each of which serve to index portions of root index level 510, and a plurality of leaf level indexes 514 for each of data pages 1-N. For purposes of description, a first leaf index 516 and a second leaf index 518 are identified in FIG. 5A and system 500A. As illustrated in system 500A, the data pages 1-N, including first data page 502-1 and second data page 502-2, are forward-scanned in this configuration, shown as each leaf index 514, which corresponds to a data page, having a logically adjacent next leaf and corresponding data page as sequentially forward link, shown exemplarily as a sequentially forward scan 520, which progresses from first leaf index 516 (and first data page 502-1), to second leaf index 518 (second data page 502-2), to the third leaf index ("Leaf (3)" in FIG. 5A) that corresponds to the third data page, etc. It should be noted, however, that sequentially backward links are also contemplated herein and are described in further detail in FIG. 5C below.

It should be noted that any number of levels, and sub-indexes within a given level, of page index 508 for any number of index pages may be present in embodiments, and that the specific configuration/state of page index 508 is illustratively exemplary, and non-limiting in nature.

In step 404 of flowchart 400 in FIG. 4, a request that is associated with the data of the first page, and a next page identifier of a logically adjacent page of the database that is logically adjacent with respect to the first page at the time the request is generated, are received from a compute node of the computing system. For instance, a compute node, such as one of compute node(s) 122 of FIG. 1B and/or system 200 when acting as a compute node is configured according to embodiments to provide a request, to the page server (e.g., system 200 when so configured), that is associated with the data stored by the page server in a data page. The page server, referring to system 200 in such a configuration, may be enabled to receive the request via network interface 228. In embodiments, the request includes a next data page ID that is valid at the time the request is generated by the compute node and that specifies what the next adjacent, sequential data page is as identified in a page index maintained by the page server.

Referring now to FIG. 5B, system 500B may be an embodiment of system 500A of FIG. 5A, and includes first data page 502-1, second data page 502-2, and page index 508, as described above for FIG. 5A, with changes noted as follows for a second configuration/state of page index 508, as well as second data page 502-2, and page index 508. For example, in the context of step 404 in flowchart 400, FIG. 5B illustrates a request 522 provided by a compute node to system 500B where request 522 comprises the operation/request, which may be a request to read data for a specific data page, as well as a next page ID that identifies the adjacent, sequential data page determined by index manager 210 of system 200 in FIG. 2 (at a time T1 when the request was generated by the compute node) for the data page in the request, as described above. In an example for which the operation/request is to read data 504-1 of first data page 502-1 in FIG. 5A, request 522 specifies this operation/request and specifies that the next data page ID in compute node page index at the time T1 is page 2 ID 506-1 as shown in FIG. 5A. While request 522 is described as referencing data of a single data page, it should be noted that embodiments herein also contemplate requests in which multiple data pages are specified having respective next expected data pages in other embodiments.

However, in the time that it took request 522 to propagate from the compute node to system 500B in FIG. 5B to being the request/operation, another different operation at the compute node caused a page split for first data page 502-1 at a time T2 that is later than time T1, in continuance of the example above. This is illustrated in FIG. 5B as first data page 1 including a data portion 504-1A, which comprises a part of data 504-1 shown in FIG. 5A. The page split of first page 502-1 also generates a new data page which is illustrated as new data page 502-3 (data page N+1) that includes data 504-1B which comprises another part of data 504-1 of FIG. 5A and which may also comprise new data that required or provoked the page split.

Additionally, the page split may cause the next page IDs of the data pages of system 500B to be updated based on corresponding updates to page index 508. For instance, page 2 ID 506-1 is updated to a next data page ID of page N+1 ID 506-1A while new data page 502-3 includes a next data page ID of page 2 ID 506-1B. Likewise, root level index 510 and first level index 1.1 of first level indexes 512 are shown as reflecting the new data page 502-3 generated from the page split with a data page ID 'N+1', which is also reflected in a new leaf index 524 that is generated at time T3 (also after time T1). Still further, the next adjacent, sequential data page linking for first leaf index 516 (and first data page 502-1) now points to leaf N+1 (and new data page 502-3), which in turn points to second leaf index 518 (and second data page 502-2). Accordingly, the forward links, from left and first data page 502-1 to right and an ultimate data page with page N ID (not shown) corresponding to leaf index N, is maintained, where an ultimate forward link 526, when necessary, points to a data page of another page server.

Referring now to FIG. 5C, as noted above, sequentially backward links, rather than forward links in sequentially forward scan 520 of FIG. 5B, are also contemplated herein. FIG. 5C may be an embodiment of FIG. 5A and page index 508, as described above for FIG. 5A, with changes noted as follows for sequentially backward links in page index 508. Page index 508 in FIG. 5C is show as an alternate implementation of page index 508 in FIG. 5A that includes a sequentially backward scan 530. In this implementation, newly-generated data pages, e.g., from page splits, are inserted in page index 508 to the left, instead of to the right, where an ultimate backward link 532, when necessary, points to a data page of another page server. The embodiments herein are enabled to handle forward and backward sequential scans without deviating from the other operations and functions described herein.

Referring back again to FIG. 5B, it is described above how the updating of data pages and page indexes is performed for page splits that generate new data pages. However, because request 522 in FIG. 5B was generated by the compute node at time T1 before the page split and subsequent updating were performed (at times T2 and T3), as reflected in the changes in the page index and data page from system 500A in FIG. 5A to system 500B in FIG. 5B, the page server in the second state shown in system 500B of FIG. 5B receives request 522, in this example to read data 504-1 of first data page 502-1 in FIG. 5A, and would, without the embodiments herein implemented, simply read first data page 502-1 for data 504-1 and return the read data to the compute node because request 522 does not reflect the page split described above. In such scenarios under prior implementations, incomplete and/or incorrect data would be read and/or returned.

Referring also to FIG. 4, in step 406, a portion of the data is read from the first page. For instance, based on request 522 as received in step 404 described above, a page server is configured to read data of the requested data page, e.g., via operations processor 222 of computing device 202 when the request is for data to be returned to the compute node and/or pushdown engine 220 of page QP pushdown manager 234 when the request is associated with a pushdown operation.

In view of FIG. 5B and continuing with the example above, request 522 specifies that data 504-1 be read from first data page 502-1, and that the expected next adjacent data page be second data page 502-2. Operations processor 222 or pushdown engine 220 of system 200 in FIG. 2, however, instead read data 504-1A (because of the page split) from first data page 502-1.

Referring also again to FIG. 4, in step 408 of flowchart 400, a second page identifier is identified from the first page. For example, after step 406 and completion of reading data 504-1 from first data page 502-1, page split engine 216 of page QP pushdown manager 234 in FIG. 2 is configured to identify from first data page 502-1 a next data page ID that corresponds to the adjacent, sequential data page with respect to first data page 502-1. In the described example, page split engine 216 reads page N+1 ID 506-1A as the second page identifier, which corresponds to new data page 502-3.

In 410 of flowchart 400, it is determined that a page split in the first page has occurred at the page server subsequent to receiving the request, the page split generating a second page at the page server, or at a different page server, as a new page in the database that includes another portion of the data, based at least on a comparison between the second page identifier and the next page identifier. For instance, page split engine 216, having identified the second page identifier of the next adjacent page in step 408 above, is configured to compare the second page identifier, e.g., page N+1 ID 506-1A (also reflected in page index 508 in FIG. 5B at leaf index 524) with the next page identifier (page 2 ID 506-1) specified in request 522 provided by the compute node. In other words, a page split has occurred that generated new data page 502-3, which includes in data 504-1B a portion of original data 504-1 (from FIG. 5A) that is not in data 504-1A of first data page 502-1, and page split engine 216 is still enabled by the embodiments herein to determine during the requested reading of the data that the page split has occurred and that a portion of original data 504-1 resides in another data page or other data pages and not in first data page 502-1. In other words, because the actual next data page does not match the expected data page from the perspective of the compute node at time T1 when the request was generated, page split engine 216 determines the page split has occurred and, thus, new data page 502-3 has been generated. In embodiments, it is determined that the new page in the database that is generated by the page split is located/stored a different page server. In such scenarios, the page server may perform operations as similarly described below for the steps of flow diagram 600, in FIG. 6, where only the portion of the data read at the page server on the first data page is returned to the compute node by the page server, and in embodiments the returned portion of the data is provided with a data-remaining notification that indicates other portions of the data are stored at the different page server.

Therefore, page split engine 216 enables a page server to extend fulfillment of the read operation by reading the remainder of the requested data from another data page, according to embodiments. The examples herein also provide for the handling of diverse scenarios with respect to extensions of fulfillment, available of data and data pages, performing QP pushdown operations, and/or the like, a non-limiting set of which will be described below additionally in view of FIG. 6.

In FIG. 4, and step 412 of flowchart 400, subsequent to the determining, fulfillment of the request is extended beyond reading the first page by reading, from the second page, the other portion of the data when the second page is at the page server. For example, page split engine 216 of system 200 in FIG. 2 is configured to detect page splits, as described above, and to locate newly-generated data pages that correspond to the page splits. After the page server reads a portion of the requested data from the data page and page split engine 216 determines a page split of the data page has occurred (as in step 410), the split page that is newly generated and that now includes another portion of the requested data and/or new data that should be read in association with the request, is read by the page server, e.g., via operations processor 222 of computing device 202 when the request is for data to be returned to the compute node and/or pushdown engine 220 of page QP pushdown manager 234 when the request is associated with a pushdown operation. This extends fulfillment of the request (in the example provided: to read data 504-1 from first data page 502-1) beyond reading the first data page, and also reading the second (new) data page, to capture all of data 504-1. In the example above, this requires reading data 504-1B in new data page 502-3 by the page server.

Therefore, page split engine 216 enables a page server to extend fulfillment of the read operation by preventing the operation from concluding/failing and by causing the remainder of the requested data to be read from another data page, according to embodiments. The examples herein also provide for the handling of diverse scenarios with respect to extensions of fulfillment, availability of data and data pages, performing QP pushdown operations, and/or the like, a non-limiting set of which will be described below in view of step 414 and step 416 of flowchart 400, and additionally in view of flow diagram 600 in FIG. 6.

Referring now to FIG. 6, flow diagram 600, begins subsequent to step 412 of flowchart 400, in embodiments. Flow diagram 600 illustrates the handling of diverse scenarios with respect to extensions of fulfillment, availability of data and data pages, performing QP pushdown operations, etc., in view of flowchart 400.

For example, in step 602 of flow diagram 600, a third page identifier of a logically adjacent page of the database with respect to the second page is identified from the second page. Step 602 may be performed similarly as described above for step 408 except that the page read iteration in step 602 is based on the second data page instead of the first data page. Continuing with the illustrative example from above, new data page 502-3 in FIG. 5A, having a next page ID of page 2 ID 506-1B that corresponds to second data page 502-2, may correspond to the second page in step 602.

In step 604, it is determined if the third page identifier from step 602 matches the next page ID received in the request (e.g., request 522 of FIG. 5B) that corresponds to the next data page anticipated/expected by the compute node when request 522 is generated at time T1. In embodiments, this determination may be performed by page split engine 216 of system 200 in FIG. 2, as similarly described with respect to step 410 of flowchart 400 in FIG. 4. In the described example, request 522 calls for data 504-1 of first data page 502-1 to be read, and also provides that the next expected data page is second data page 502-2 via including in request 522 the next page ID of page 2 ID 506-1. If page split engine 216 determines a match between the page IDs, step 604 of flow diagram 600 may proceed to step 414 and/or step 416 of flowchart 400 as the read operation is complete and all of data 504-1 is read (i.e., both data 504-1A and data 504-1B 2 have been read) and the next data page expected by the compute node has been identified.

Turning again to FIG. 4, flowchart 400 may proceed from step 412 to step 414, in embodiments. In step 414, the portion of the data, and the other portion of the data if read, are returned to the compute node from the page server. For example, a page sever as described herein is configured to fulfill requests for data from compute nodes by returning requested data procured via read operations over a network to the compute nodes. Based on the embodiments herein, requests for data from compute nodes may be fulfilled in a more complete and correct manner by page servers based on the operations of page split engine 216 for detecting page splits that otherwise would not be detected prior to a page server returning only a portion of the requested data, which would cause the compute note to issue another I/O operation to the page server for the rest of the data, delaying completion of the request and expending processing and network resources unnecessarily. Additionally, as noted above, only the portion of the data read from the page server may be returned to the compute node when the new page generated by the page split is stored at a different page server.

Flowchart 400 may additionally or alternatively proceed from step 412 to step 416, in embodiments. In step 416 of flowchart 400, a query processing operation, indicated by the compute node, is performed at the page server based on the portion of the data and the other portion of the data. For instance, a QP pushdown operation acting on the data that was requested and then read, as described above, may be performed by pushdown engine 220 in page QP pushdown manager 234 of system 200 in FIG. 2. In existing solutions, page servers are not configured and enabled to perform QP operations through pushdowns from a compute node; that is, the compute node handles QP operations exclusively. In contrast, the embodiments herein, e.g., via pushdown engine 220, are enabled to perform QP pushdown operations received from a compute node. QP pushdown operations performed utilizing pushdown engine 220 may include, without limitation, eligible data operations such as row mode filters for non-sargable predicates and row mode bitmap filters, SELECT operation list expressions and row mode scalar aggregation pushdowns, and batch mode filters and aggregations, etc.

As an illustrative and non-limiting example, a compute node may provide serialized metadata information and query text fragments to a page server, along with data page IDs corresponding to data page that include the data required for the QP pushdown operations, from metadata generator 212 and pushdown generator 214 of node QP pushdown manager 232 of system 200 in FIG. 2. QP pushdown engine 220 is configured to compile the query text fragments using the metadata at the page server to generate an executable query plan for the pushdown operation. This also enables a compute node to pushdown QP operations to different page servers that run different code packages, which in turn allows independent upgrades of either compute nodes or page servers without version conflicts.

In embodiments, results of QP pushdown operations may be provided from the page server to the compute node.

Referring back again to FIG. 6, if page split engine 216 determines at step 604 that the third page identifier from step 602 does not match the next page ID received in the request, page split engine 216 also determines that the page split from step 410 in flowchart 400 causes multiple new pages to be generated or that another page split associated with the data requested has occurred, e.g., shown as another new data page 502-4 in FIG. 5B having a corresponding leaf index 528 in page index 508. While other new data page 502-4 is shown for illustration with respect to leaf index 528 in page index 508, it is contemplated that other new data page 502-4 may be referenced in a different page server's index because other new data page 502-4 is stored at the different page server. In such cases, flow diagram 600 then continues to step 606. In step 606, it is determined if the third page identifier from step 602 matches the page identifier of a data page on another page server, e.g., if the third page identifier is not present in page index 508 of the current page server (as exemplarily illustrated in FIG. 5B). If the next data page is located at another page server, flow diagram proceeds to step 608. In step 608, the portion of the data and the other portion of the data are returned to the compute node from the page server with a data-remaining notification for the request which may cause the compute node to issue an I/O operation to the other page server that maintains the data page having the remaining data that was previously requested in request 522. As described herein, embodiments also contemplate that a first page split may result in a new data page being stored at the different page server. That is, the flow diagram 600, as exemplarily illustrated, is not so limited, and its steps may be performed when an identifier of second data page, after the page split, indicates that the next data page resides at the different/other page server. Similarly, any given page resulting from one or more page splits may be handled in such a fashion based on a comparison of a next actual data page indicated in a page index of a page server and a next expected data page provided from the compute node.

If is determined that the next data page is located at the current page server, flow diagram 600 continues from step 606 to step 610. In step 610, a portion of the data is read from the page associated with the third page identifier, as similarly described for reading data in step 406 of flowchart 400, and flow diagram 600 may return to step 602 from step 610. That is, any number of iterations of flow diagram 600 may be performed for a corresponding number of page splits that have occurred.

As previously noted, embodiments herein also provide for page affinity in storing data generated and/or altered (in value/content, storage, configuration, and/or the like) by operations, including without limitation, new data pages an page index level splits caused by page splits, and off-row data. Off-row data comprises various types of data associated with the data in a data page but maintained outside of rows of the data, e.g., on another data page. Off-row data includes, but is not limited to, data such as persistent version store (PVS) data pages, small large object (SLOB) pages (e.g., secondary page overflow), unordered collections of rows such as heap forwarded rows, and/or the like. In prior solutions, new data pages generated from page splits and off-row data associated with a table or database might be stored at any page server, and are not guaranteed to be collocated at the same page server with their associated data in the table or database. Therefore, any page server read that access off-row data may need to contact other page servers to complete the request-however, different implementations do not allow for direct communications/requests between page servers, and thus, page servers must fail back to the compute node which in turn provides additional I/O requests to other page servers so the data required can be read locally at the compute node. As noted herein, this approach has drawbacks such as network bandwidth impact, delayed time to complete operations, memory/processing usage impacts at the compute node, etc. Additionally, page servers may be precluded from performing QP pushdown operations when the data and off-row data for a particular operation are not collocated at a single page server.

The embodiments herein reduce these impacts and issues by providing page allocation for new data pages and for off-row data so that pages belonging to the same data object are collocated at a page server. Allocator 224 is configured to increase affinity and collocation of data pages/page indexes and off-row data, as described herein. The described embodiments are also applicable to on premise configurations to collocate data pages with off-row data on the same file. In embodiments, a page server such as one of page server(s) 124 of FIG. 1B and/or system 200 of FIG. 2 via allocator 224, when so configured, may be enabled to reserve or pre-allocate an amount or a percentage of space in data pages stored at storage 130 and/or storage 236, respectively, or in memory 206 in various embodiments, for newly-generated data pages and off-row data to achieve affinity and/or collocation for related data, i.e., data that is "valid" for achieving collocation and page affinity as described herein. In other words, embodiments herein may require that new data pages, etc., and generated off-row data be validated as related to existing data already stored at a page server in order to store the new/generated data.

Newly-generated data pages and changes to page indexes, such as those generated by page splits as described above, may be allocated to page servers that maintain related data pages and page indexes. That is, rather than allocating data pages/page indexes to different page servers as in prior implementations, e.g., for load balancing, storage considerations, based on scheduling, etc., embodiments herein provide for collocating new data pages and changes to page indexes at the same page server that maintains related data. This allows for QP pushdown operations to be performed by page servers through page affinity. When strict page affinity is not possible due to storage space constraints/availability at a page server, data pages, etc., may still be stored at other page servers using a "soft" affinity such that operations which generate new data are allowed to complete without failing.

In prior implementations, PVSs use an allocation cache that is partitioned on a scheduler so that there is an entry point in the PVS from each scheduler irrespective of which page server or file the data page belongs to. In such implementations, a background task pre-allocates PVS pages and adds them to the allocation caches to avoid potential file growth operations on write paths. In contrast, PVS page allocation according to the embodiments herein utilizes allocation caches so that there is one allocation cache for each page server. Additionally, embodiments pre-allocate PVS pages to allocate pages for each cache in a round robin fashion. When generating a version of a DB, if a DB server requires a new PVS page, it first looks in the allocation cache that matches the page server of the data page. If the file or page server is not full, a new page is allocated to the cache, while if the file or page server is full, a page in a different cache is located rather than failing the operation back to the compute node. In this case, a request would return from the page server to the compute node where it will be processed locally. However, to prevent the scenario in which the new page is not collocated, as noted above, a page server may reserve storage to accommodate the allocation for PVS pages. As version scans are common in many DB servers, the embodiments herein for PVS page allocation significantly improve page server collocation.

Regarding heap forwarding, heaps are on-disk data structures that do not guarantee any ordering. Heaps are implemented as a sequence of pages, and in heaps, rows are identified by reference to a row identifier (RID) that includes the file number, the data page number, and the slot on the page (e.g., FileID:PageID:SlotID). Because heaps are identified by their physical locations, they cannot be moved to a different page or slot. If a heap row is updated, and as a result it no longer fits on a page, a new page must be identified that has sufficient space to move the contents of the row there, while keeping a stub that points to the new RID in the original location. This process is called "forwarding." Prior heap allocation algorithms are agnostic to page servers, and thus, new page resulting from forwarding can be allocated on a different page server. To avoid this, embodiments herein utilize a similar scheme as described above for handling PVS page allocation. For example, the heap free space cache is populated with pages from all page servers in a round robin fashion, and when an update operation needs to forward the row for the heap, a page in the cache in the same page server that hosts the original page is identified. Thus, in most cases, embodiments herein avoid multiple I/O trips between the storage layer of page servers and the compute node when heap rows span multiple pages. As in the case of PVS pages, a page on the same page server may not be available during heap forwarding, and requests may be returned to the compute node for local processing.

In prior solutions, SLOB pages are used to store columns of data that do not fit on the main page. These SLOB pages are typically created in a different allocation unit than the one used for data pages. As a result, these allocation units can be created on different page servers, and this scenario limits QP pushdown operations at page servers because a row can span multiple page servers. To address this concern, a SLOB allocation, e.g., by allocator 224 in FIG. 2, is performed in the same page server as the allocation where the main data resides in its data page. As with the other cases, when not possible to collocate these allocations on the same page server, a request can fail back to the compute node for other allocation options.

Referring now to FIG. 7, a flowchart 700 is shown for page split detection and affinity in query processing pushdowns, according to an example embodiment. System 100A in FIG. 1A, system 100B in FIG. 1B, and/or system 200 in FIG. 2 are configured to operate according to flowchart 700. Further structural and operational examples will be apparent to persons skilled in the relevant art(s) based on the following descriptions. Flowchart 700 is described below in the context of system 100B in FIG. 1B and system 200 of FIG. 2. It should be understood, however, the following description is also applicable to system 100A in FIG. 1A.

Flowchart 700 begins at step 702. In step 702, data is received at a compute node of the processing system. For example, a compute node such as compute node(s) 122 of FIG. 1B and/or system 200 of FIG. 2, when so configured, receive data stored in data pages from page servers such as such as page server(s) 124 of FIG. 1B and/or system 200 of FIG. 2, when so configured, as described herein.

In step 704, an operation is performed on the data by the compute node. For instance, a compute node as defined herein may perform QP operations on data that is returned from page servers (as in step 702).

In step 706, it is determined, based on the operation, that at least one of a split data page associated with the data or off-row data has been generated, the off-row data being associated with the data and maintained outside of rows of the data. For example, an operations processor of a compute node, such as operations processor 222 in system 200, is configured to determine that the operation performed in step 704 generates a new, split data page or off-row data that is associated with the data received in step 702.

In step 708, a data page at a page server of a plurality of page servers at which to store the generated split data page or at which to store the off-row data is determined, based on locating the data page that is stored by the page server and that includes the data which corresponds to the operation. For instance, allocator 224 in system 200 is configured to determine storage space to be allocated for maintaining data pages generated from page splits and/or for maintaining off-row data. Allocator 224 is configured to locate a page server that maintains the data pages in which the received and operated-on data from step 702 and step 704 is stored. In other words, allocator 224 is configured to determine where the data from the operation is stored so that collocation and affinity of any new data pages from page splits, and any new off-row data, with the operated-on data can be achieved. Such collocation and affinity allows for QP pushdown operations to later be performed by page servers, and also decreases network traffic between compute nodes and page servers, decreases compute node resource usage, and improves times to finish operations, as noted herein.

In step 710, store at least one of the generated split data page or the off-row data at the page server based on the data being stored by the page server. For example, allocator 224 is configured to cause the compute node to provide the generated split data page or the off-row data to the page server identified via step 708 for storage thereof, providing collocation and affinity for any new data.

In step 712, a pushed-down query processing operation associated with the data and with the off-row data is received at the page server and subsequent to the off-row data being stored at the page server. For instance, a page server, as described herein, is configured to receive QP pushdown operations from a compute node, e.g., via pushdown generator 214 of system 200 in FIG. 2, to be performed by the page server.

In step 714, the pushed-down query processing operation is performed at the page server based on both the data and the off-row data being stored at the page server. For example, pushdown engine 220 and/or operations processor 222 of system 200 in FIG. 2 are configured to compile, assemble, and/or execute pushed-down query processing operations, as described herein. Step 714 may be performed similarly as described for step 416 of flowchart 400, where step 714 performs the QP pushdown operation based on the collocated data stored in step 710 and other related data that was stored by the page server prior to step 710. It should be noted that the page server is enabled to perform the QP pushdown operation, according to embodiments, in step 714 because the data and off-row data required for the operation are collocated at the page server based on affinity as described above.

In FIG. 8, a flowchart 800 is shown for page split detection and affinity in query processing pushdowns, according to an example embodiment. System 100A in FIG. 1A, system 100B in FIG. 1B, and/or system 200 in FIG. 2 are configured to operate according to flowchart 800. Further structural and operational examples will be apparent to persons skilled in the relevant art(s) based on the following descriptions. Flowchart 800 is an embodiment of flowchart 700 in FIG. 7, e.g., performed prior to or as part of step 710. In embodiments, the steps of flowchart 800 are specific to various types of off-row data described herein, and in such embodiments, a single step may be performed for a specific off-row data, with other steps being optional. Flowchart 800 is described below in the context of system 100B in FIG. 1B, system 200 of FIG. 2, and flowchart 700. It should be understood, however, the following description is also applicable to system 100A in FIG. 1A.

Flowchart 800 begins at step 802. In step 802, a new page space is allocated at the page server, and the generated split data page is stored in the new page space. For example, allocator 224 of system 200 in FIG. 2 is configured to allocate new page space at the page server to store a generated split data page, i.e., a new data page generated because of a page split. Allocator 224 causes a compute node to provide the generated split data page to a page server for storage thereof at the allocated space. In embodiments, the allocated space is determined/specified by allocator 224 in a compute node that directs a page server to allocate the new page space. Allocator 224 determines/specifies the new page space based on entries (e.g., log records of transactions/operations) in a log cache of a log server (not shown for brevity and illustrative clarity) that may be communicatively coupled to compute nodes and/or to page servers, in embodiments, as described herein.

In step 804, a new page is allocated in an allocation cache of the page server, and the off-row data is stored in the new page, wherein the off-row data comprises persistent version store data. For instance, allocator 224 of system 200 is configured to allocate a new page in an allocation cache of a page server, e.g., of memory 206 and/or storage 234 of system 200 in FIG. 2, and to store the PVS page data in the new page of the allocation cache. Allocator 224 causes a compute node to provide the PVS page data to a page server for storage thereof at the allocation cache.

In step 806, the off-row data is stored in the page or in another page of the page server, wherein the off-row data comprises unsorted data or a large object type of data. For example, allocator 224 of system 200 is configured to cause a compute node to provide the off-row data, as unsorted data, e.g., heap forwarded rows, or a large object type of data, e.g., SLOB pages, to the page server that includes the data page determined at step 708 of flowchart 700 for storage thereof.

As noted above, allocation of space for new pages may be performed by allocator 214 based on information maintained in a log cache of a log server. In embodiments, a compute node may be configured to perform both read and write operations that alter the state of the database. In order to maintain Atomicity, Consistency, Isolation and Durability (ACID) properties of the transaction, a compute node may be configured to generate a log record for the transaction when the transaction commits and store that record locally in a transaction log of the log cache before any data modifications caused by the transaction are written to disk. A log record for a committed transaction includes all the information necessary to re-do the transaction in the event there is a problem (e.g., power failure) before the data modified by the transaction can be stored (e.g., in data page(s) 222 of storage 236 of FIG. 2). A log record may comprise information that includes, but is not limited to, a transaction identifier, a log sequence number, a time stamp, information indicating what data object or objects was/were modified and how, and the like. Regarding log sequence numbers, the transaction log operates logically as if the transaction log is a sequence of log records with each log record identified by a log sequence number (LSN). Each new log record is written to the logical end of the transaction log with an LSN that is higher than the LSN of the record before it. Log records are stored in a serial sequence as they are created such that if LSN2 is greater than LSN1, the change described by the log record referred to by LSN2 occurred after the change described by the log record LSN1. Each log record also contains a transaction identifier of the transaction to which it belongs. That is, a transaction identifier is information that uniquely identifies the transaction corresponding to the log record (e.g., a globally unique identifier (GUID)). The log record corresponding to the transaction is thereafter forwarded to the log server which is configured to provide a log service, in an embodiment. The log service on the log server accepts log records from the compute node, persists them in the log cache, and subsequently forwards the log records to any other compute nodes or compute replicas (i.e., secondary compute nodes) so they can update their local log caches. The log server also forwards the log records to the relevant page server(s) so that the data can be updated there. In this way, all data changes from the compute node are propagated through the log service to all the secondary compute nodes and page servers. Finally, the log records are pushed out to long-term storage such as, for example, storage 236. In addition to transaction commits, other types of operations are may also be recorded at a primary compute node and subsequently be forwarded to including, but not limited to, the start of a transaction, extent and page allocation or deallocation, creating or dropping a table or index, every data or schema modification, and/or the like.

In FIG. 9, a flowchart 900 is shown for page split detection and affinity in query processing pushdowns, according to an example embodiment. System 100A in FIG. 1A, system 100B in FIG. 1B, and/or system 200 in FIG. 2 are configured to operate according to flowchart 900. Further structural and operational examples will be apparent to persons skilled in the relevant art(s) based on the following descriptions. Flowchart 900 is an embodiment of flowchart 700 in FIG. 7, and is described below in the context of system 100B in FIG. 1B, system 200 of FIG. 2, and flowchart 700. It should be understood, however, the following description is also applicable to system 100A in FIG. 1A.

Flowchart 900 begins at step 902. In step 902, an allocation of storage space is reserved at the page server as off-row data storage. For example, allocator 224 of system 200 in FIG. 2 is configured to reserve an amount of storage space at a page server for the storage of off-row data, as described herein. Allocator 224 is configured to reserve or pre-allocate an amount or a percentage of space in data pages, allocation caches, etc., stored at storage 130 and/or storage 236, of FIGS. 1 and 2 respectively, or in memory 206 of FIG. 2, in embodiments. In this way, achieving collocation and affinity for related data is readily achieved, according to embodiments.

In step 904, the off-row data is determined as being valid for inclusion in the off-row data storage prior to the off-row data being stored at the page server in the off-row storage. For instance, allocator 224, off-row data manager 218, and/or operations processor 222 of system 200 in FIG. 2 may be configured to determine that data is "valid," or related to existing data already stored at a page server, via page index 226 of system 200. If the off-row data is "valid," it may be stored in the reserved off-row storage.

In FIG. 10, a flowchart 1000 is shown for page split detection and affinity in query processing pushdowns, according to an example embodiment. System 100A in FIG. 1A, system 100B in FIG. 1B, and/or system 200 in FIG. 2 are configured to operate according to flowchart 1000. Further structural and operational examples will be apparent to persons skilled in the relevant art(s) based on the following descriptions. Flowchart 1000 is an alternate embodiment of flowchart 700 in FIG. 7, e.g., subsequent to step 708, and is described below in the context of system 100B in FIG. 1B, system 200 of FIG. 2, and flowchart 700. It should be understood, however, the following description is also applicable to system 100A in FIG. 1A.

Flowchart 1000 begins at step 1002. In step 1002, it is determined, subsequent to the page stored by the page server being determined, that the page server lacks space to store the off-row data. For example, in step 708 of flowchart 700, a data page at a page server that stores related to the off-row data is determined by allocator 224 of system 200 in FIG. 2 in order to identify the page server as the location for storing the off-row data. However, it may be determined by allocator 224, index manager 210, or another component of system 200, is configured to determine, e.g., via page index 226 or another component related to data storage management, that the identified page server is full, or lacks the required, free storage capacity to store the off-row data. In such embodiments, the off-row data cannot be collocated with the related data through strict affinity, and therefore storage with soft affinity may be performed.

In step 1004, another page server that includes space to store the off-row data is identified. For instance, allocator 224 of system 200 may identify another page server, e.g., of page server(s) 124 in FIG. 1B, at which the off-row data may be stored.

In step 1006, the off-row data is stored at the other page server to avoid failing the operation. For example, allocator 224 of system 200 is configured to cause a compute node to provide off-row data to a different page server instead of the page server that stores data related to the off-row data.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A in FIG. 1A, system 100B in FIG. 1B, system 200 in FIG. 2, system 500A of FIG. 5A, system 500B of FIG. 5B, and/or system 500C of FIG. 5C, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 11 depicts an exemplary implementation of a computing device 1100 in which embodiments may be implemented. For example, embodiments described herein may be implemented in one or more computing devices or systems similar to computing device 1100, or multiple instances of a computing device 1100, in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, servers, and/or clusters, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to system 100A in FIG. 1A, system 100B in FIG. 1B, system 200 in FIG. 2, system 500A of FIG. 5A, system 500B of FIG. 5B, and/or system 500C of FIG. 5C, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

TPM 1154 may be connected to bus 1106, and may be an embodiment of any TPM, as would be understood by one of skill in the relevant art(s) having the benefit of this disclosure. For example, TPM 1154 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer program media, computer-readable storage devices, computer-readable media, and/or computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for page split detection and affinity in query processing pushdowns. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein provide for increased accuracy of data reads from data pages at page servers by configuring a page server to detect that the data page being read has split. Thus, the page server is enabled to identify another data page at the page server in which a portion of the desired data is now located, to read the portion of data in other data page, and to return complete, and accurate data without additional network traffic and actions required by the compute node, while achieving storage affinity to enable page servers to perform pushdown operations from a compute node. The described embodiments are also adaptable to server systems in addition to database systems that may be configured, as described herein, to perform pushdown operations and/or affinity for data storage.

According to the described embodiments for page split detection and affinity in query processing pushdowns, solutions are provided with unique components and configurations to improve processing loads and efficiency in systems of compute nodes and page servers, reduce memory pressure at compute nodes, and greatly reduce network bandwidth usage and I/O operations between compute nodes and page servers, while also providing faster times to complete operations, e.g., via pushdown operations, that were previously not available for software-based services, much less for the specific embodiments described herein for compute nodes and associated page servers. Accordingly, improved query performance for analytical queries against large data sets are realized by the described embodiments.

The additional examples and embodiments described in this Section may be applicable to examples disclosed in any other Section or subsection of this disclosure.

Embodiments in this description provide for systems, devices, and methods for page split detection and affinity in query processing pushdowns. For example, a method performed by a page server in a computing system is described herein for performing such embodiments. The method includes storing a first page of a database, the first page including data; receiving, from a compute node of the computing system, a request that is associated with the data of the first page, and a next page identifier of a logically adjacent page of the database that is logically adjacent with respect to the first page at the time the request is generated; reading a portion of the data from the first page; identifying a second page identifier from the first page; determining that a page split in the first page has occurred at the page server subsequent to receiving the request, the page split generating a second page at the page server as a new page in the database that includes another portion of the data, based at least on a comparison between the second page identifier and the next page identifier; and subsequent to the determining, extending fulfillment of the request beyond reading the first page by reading, from the second page, the other portion of the data.

In an embodiment, the method includes identifying, from the second page, a third page identifier of a logically adjacent page of the database with respect to the second page; and further extending the fulfillment of the request by reading additional data from an additional page that is associated with the third page identifier.

In an embodiment, the method includes identifying, from the second page, a third page identifier of a logically adjacent page of the database with respect to the second page; and concluding the fulfillment of the request based at least on a determination that the third page identifier matches the next page identifier.

In an embodiment of the method, concluding the fulfillment includes returning the portion of the data and the other portion of the data to the compute node from the page server.

In an embodiment, the method includes identifying, from the second page, a third page identifier of a logically adjacent page of the database with respect to the second page; determining that a third page associated with the third page identifier is located at a different page server; and returning the portion of the data and the other portion of the data to the compute node from the page server with a data-remaining notification for the request.

In an embodiment of the method, at least one of the reading the portion of the data from the first page or the reading the other portion of the data from the second page includes reading newly-written data that caused the page split. In an embodiment of the method, logically adjacent comprises at least one of sequentially forward or sequentially backward.

In an embodiment, the method includes performing a query processing operation, indicated by the compute node, at the page server based on the portion of the data and the other portion of the data.

A system is also described herein. The system may be configured and enabled in various ways for page split detection and affinity in query processing pushdowns, as described herein. In an embodiment, the system includes a memory that stores program instructions, and a processing system configured to execute the program instructions. The program instructions cause the processing system to store a first page of a database, the first page including data; receive, from a compute node of the computing system a request that is associated with the data of the first page, and a next page identifier of a logically adjacent page of the database that is logically adjacent with respect to the first page at the time the request is generated; read a portion of the data from the first page; identify a second page identifier from the first page; determine that a page split in the first page has occurred at the page server subsequent to receiving the request, the page split generating a second page at the page server as a new page in the database that includes another portion of the data, based at least on a comparison between the second page identifier and the next page identifier; and subsequent to the determining: extend fulfillment of the request beyond reading the first page by reading, from the second page, the other portion of the data based on the second page being stored at the page server; or return the portion of the data to the compute node from the page server with a data-remaining notification for the request based on a determination that the second page is located at a different page server.

In an embodiment of the system, the second page is stored at the page server, and the program instructions cause the processing system to identify, from the second page, a third page identifier of a logically adjacent page of the database with respect to the second page; and further extend the fulfillment of the request by reading additional data from an additional page that is associated with the third page identifier.

In an embodiment of the system, the second page is stored at the page server, and the program instructions cause the processing system to identify, from the second page, a third page identifier of a logically adjacent page of the database with respect to the second page; and conclude the fulfillment of the request based at least on a determination that the third page identifier matches the next page identifier.

In an embodiment of the system, the program instructions, for concluding the fulfillment, cause the processing system to return the portion of the data and the other portion of the data to the compute node from the page server.

In an embodiment of the system, where the program instructions cause the processing system to identify, from the second page, a third page identifier of a logically adjacent page of the database with respect to the second page; determine that a third page associated with the third page identifier is located at a different page server; and return the portion of the data and the other portion of the data to the compute node from the page server with a data-remaining notification for the request.

In an embodiment of the system, for the program instructions, at least one of the reading the portion of the data from the first page or the reading the other portion of the data from the second page includes reading newly-written data that caused the page split; or logically adjacent comprises at least one of sequentially forward or sequentially backward.

In an embodiment of the system, the second page is stored at the page server, and the program instructions cause the processing system to perform a query processing operation, indicated by the compute node, at the page server based on the portion of the data and the other portion of the data.

A computer-readable storage medium having program instructions recorded thereon that are configured to cause a processing system that executes the program instructions to perform operations and functions is also described. The program instructions are for page split detection and affinity in query processing pushdowns. The program instructions cause the processing system that executes the program instructions to receive data at a compute node of the processing system; perform an operation on the data by the compute node; determine, based on the operation, that at least one of a split data page associated with the data or off-row data has been generated, the off-row data being associated with the data and maintained outside of rows of the data; determine a data page at a page server of a plurality of page servers at which to store the generated split data page or at which to store the off-row data, based on locating the data page that is stored by the page server and that includes the data which corresponds to the operation; and store at least one of the generated split data page or the off-row data at the page server based on the data being stored by the page server.

In an embodiment of the computer-readable storage medium, the program instructions cause the processing system that executes the program instructions to receive, at the page server and subsequent to the off-row data being stored at the page server, a pushed-down query processing operation associated with the data and with the off-row data; and perform, at the page server, the pushed-down query processing operation based on both the data and the off-row data being stored at the page server.

In an embodiment of the computer-readable storage medium, the program instructions cause the processing system that executes the program instructions, in order to store the off-row data, to perform at least one of to: allocate a new page space at the page server, and store the generated split data page in the new page space; allocate a new page in an allocation cache of the page server, and store the off-row data in the new page, wherein the off-row data comprises persistent version store data; or store the off-row data in the page or in another page of the page server, wherein the off-row data comprises unsorted data or a large object type of data.

In an embodiment of the computer-readable storage medium, the program instructions cause the processing system that executes the program instructions to reserve an allocation of storage space at the page server as off-row data storage. In an embodiment, the program instructions are further configured to cause the processing system that executes the program instructions to determine the off-row data as being valid for inclusion in the off-row data storage prior to the off-row data being stored at the page server in the off-row storage.

In an embodiment of the computer-readable storage medium, the program instructions cause the processing system that executes the program instructions to determine, subsequent to the page stored by the page server being determined, that the page server lacks space to store the off-row data; identify another page server that includes space to store the off-row data; and store the off-row data at the other page server to avoid failing the operation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method comprising:
    storing, by a page server, a first page of a database, the first page including first data;
    receiving, by the page server, a database read request for the first data that includes an expected next page identifier of a page of the database that is logically adjacent to the first page at a time the database read request was generated;
    identifying, by the page server, an actual next page identifier from the first page, the actual next page identifier identifying a page of the database that is logically adjacent to the first page at a second point in time, the second point in time occurring after receiving the database read request by the page server;
    comparing, by the page server, the expected next page identifier and the actual next page identifier;
    determining, by the page server and during fulfillment of the database read request, that there is a mismatch between the expected next page identifier and the actual next page identifier, the mismatch indicating that a concurrent database operation has caused a page split in the first page to occur during the fulfillment of the database read request by the page server; and
    in response to determining that a mismatch exists, fulfilling, by the page server, the database read request using a portion of data from the first page, and a portion of data from the page of the database that is logically adjacent to the first page at the second point in time.

2. The method of claim 1, further comprising:
    identifying, from the page of the database that is logically adjacent to the first page at the second point in time, a third page identifier of a page of the database that is logically adjacent to the page of the database that is logically adjacent to the first page at the second point in time; and
    wherein fulfillment of the database read request further includes a portion of data from an additional page that is associated with the third page identifier.

3. The method of claim 1, further comprising:
    identifying, from the page of the database that is logically adjacent to the first page at the second point in time, a third page identifier of a page of the database that is logically adjacent to the page of the database that is logically adjacent to the first page at the second point in time; and
    concluding the fulfillment of the database read request based at least on a determination that the third page identifier matches the expected next page identifier.

4. The method of claim 3, wherein concluding the fulfillment comprises:
    returning the portion of data from the first page and the portion of data from the page of the database that is logically adjacent to the first page at the second point in time to the compute node from the page server.

5. The method of claim 1, further comprising:
    identifying from the page of the database that is logically adjacent to the first page at the second point in time, a third page identifier of a page of the database that is logically adjacent to the page of the database that is logically adjacent to the first page at the second point in time;
    determining that a third page associated with the third page identifier is located at a different page server; and
    returning the portion of data from the first page and the portion of data from the page of the database that is logically adjacent to the first page at the second point in time to the compute node from the page server along with a data-remaining notification for the database read request.

6. The method of claim 1, wherein at least one of the portion of the data from the first page or the portion of data from the page of the database that is logically adjacent to the first page at the second point in time includes newly-written data that caused the page split; or
    wherein logically adjacent comprises at least one of sequentially forward or sequentially backward.

7. The method of claim 1, further comprising:
    performing a query processing operation, indicated by the compute node, at the page server based on the portion of data from the first page and the portion of data from the page of the database that is logically adjacent to the first page at the second point in time.

8. A system that comprises:
    a memory that stores program instructions; and
    a processing system configured to execute the program instructions, the program instructions causing the processing system to:
    store, by a page server, a first page of a database, the first page including first data;
    receive, by the page server, a database read request for the first data that includes an expected next page identifier of a page of the database that is logically adjacent to the first page at a time the database read request was generated;
    identify, by the page server, an actual next page identifier from the first page, the actual next page identifier identifying a page of the database that is logically adjacent to the first page at a second point in time, the second point in time occurring after receiving the database read request by the server;
    compare, by the page server, the expected next page identifier and the actual next page identifier;
    determine, by the page server and during fulfillment of the database read request, that there is a mismatch between the expected next page identifier and the actual next page identifier, the mismatch indicating that a concurrent database operation has caused a page split in the first page to occur during the fulfillment of the database read request by the page server; and in response to determining that a mismatch exists, performing one of:
  fulfill, by the page server, the database read request using a portion of data from the first page and a portion of data from the page of the database that is logically adjacent to the first page at the second point in time; or
  return, by the page server, the portion of data from the first page to the compute node along with a data-remaining notification based on a determination that the page of the database that is logically adjacent to the first page at the second point in time is located at a different page server.

9. The system of claim 8, wherein the page of the database that is logically adjacent to the first page at the second point in time is stored at the page server, and wherein the program instructions cause the processing system to:
  identify, from the page of the database that is logically adjacent to the first page at the second point in time, a third page identifier of a page of the database that is logically adjacent to the page of the database that is logically adjacent to the first page at the second point in time; and
  wherein fulfillment of the database read request further includes a portion of data from an additional page that is associated with the third page identifier.

10. The system of claim 8, wherein the page of the database that is logically adjacent to the first page at the second point in time is stored at the page server, and wherein the program instructions cause the processing system to:
  identify, from the page of the database that is logically adjacent to the first page at the second point in time, a third page identifier of a page of the database that is logically adjacent to the page of the database that is logically adjacent to the first page at the second point in time; and
  conclude the fulfillment of the database read request based at least on a determination that the third page identifier matches the expected next page identifier.

11. The system of claim 10, wherein the program instructions, for concluding the fulfillment, cause the processing system to:
  return the portion of data from the first page and the portion of data from the page of the database that is logically adjacent to the first page at the second point in time to the compute node from the page server.

12. The system of claim 8, wherein the program instructions cause the processing system to:
  identify, from the page of the database that is logically adjacent to the first page at the second point in time, a third page identifier of a page of the database that is logically adjacent to the page of the database that is logically adjacent to the first page at the second point in time;
  determine that a third page associated with the third page identifier is located at a different page server; and
  return the portion of data from the first page and the portion of data from the page of the database that is logically adjacent to the first page at the second point in time to the compute node from the page server along with a data-remaining notification for the database read request.

13. The system of claim 8, wherein at least one of the portion of the data from the first page or the portion of data from the page of the database that is logically adjacent to the first page at the second point in time includes newly-written data that caused the page split; or
wherein logically adjacent comprises at least one of sequentially forward or sequentially backward.

14. The system of claim 8, wherein the page of the database that is logically adjacent to the first page at the second point in time is stored at the page server, and wherein the program instructions cause the processing system to:
  perform a query processing operation, indicated by the compute node, at the page server based on the portion of data from the first page and the portion of data from the page of the database that is logically adjacent to the first page at the second point in time.

15. A computer-readable storage medium having program instructions recorded thereon that are configured to cause a page server that executes the program instructions to:
  store a first page of a database, the first page including first data;
  receive from a compute node a database read request for the first data that includes an expected next page identifier of a page of the database that is logically adjacent to the first page at a time the database read request was generated;
  identify an actual next page identifier from the first page, the actual next page identifier identifying a page of the database that is logically adjacent to the first page at a second point in time, the second point in time occurring after receiving the database read request by the server;
  compare, by the page server, the expected next page identifier and the actual next page identifier;
  determine, during fulfillment of the database read request, that there is a mismatch between the expected next page identifier and the actual next page identifier, the mismatch indicating that a concurrent database operation has caused a page split in the first page to occur during the fulfillment of the database read request by the page server; and
  in response to determining that a mismatch exists, performing one of:
    fulfill the database read request using a portion of data from the first page and a portion of data from the page of the database that is logically adjacent to the first page at the second point in time; or
    return the portion of data from the first page to the compute node along with a data-remaining notification based on a determination that the page of the database that is logically adjacent to the first page at the second point in time is located at a different page server.

16. The computer-readable storage medium of claim 15, wherein the page of the database that is logically adjacent to the first page at the second point in time is stored at the page server, and wherein the program instructions are further configured to cause the page server that executes the program instructions to:
  identify, from the page of the database that is logically adjacent to the first page at the second point in time, a third page identifier of a page of the database that is logically adjacent to the page of the database that is logically adjacent to the first page at the second point in time; and
  wherein fulfillment of the database read request further includes a portion of data from an additional page that is associated with the third page identifier.

17. The computer-readable storage medium of claim 15, wherein the page of the database that is logically adjacent to the first page at the second point in time is stored at the page server, and wherein the program instructions are further configured to cause the page server that executes the program instructions to:

identify, from the page of the database that is logically adjacent to the first page at the second point in time, a third page identifier of a page of the database that is logically adjacent to the page of the database that is logically adjacent to the first page at the second point in time; and conclude the fulfillment of the database read request based at least on a determination that the third page identifier matches the expected next page identifier.

18. The computer-readable storage medium of claim 17, wherein the program instructions are further configured to cause the page server that executes the program instructions to:

return the portion of data from the first page and the portion of data from the page of the database that is logically adjacent to the first page at the second point in time to the compute node from the page server.

19. The computer-readable storage medium of claim 15, wherein the program instructions are further configured to cause the page server that executes the program instructions to:

identify, from the page of the database that is logically adjacent to the first page at the second point in time, a third page identifier of a page of the database that is logically adjacent to the page of the database that is logically adjacent to the first page at the second point in time;

determine that a third page associated with the third page identifier is located at a different page server; and return the portion of data from the first page and the portion of data from the page of the database that is logically adjacent to the first page at the second point in time to the compute node from the page server along with a data-remaining notification for the database read request.

20. The computer-readable storage medium of claim 15, wherein the page of the database that is logically adjacent to the first page at the second point in time is stored at the page server, and wherein the program instructions are further configured to cause the page server that executes the program instructions to:

perform a query processing operation, indicated by the compute node, at the page server based on the portion of data from the first page and the portion of data from the page of the database that is logically adjacent to the first page at the second point in time.

* * * * *